(12) United States Patent
Park et al.

(10) Patent No.: US 10,663,970 B2
(45) Date of Patent: May 26, 2020

(54) VEHICLE CONTROL DEVICE MOUNTED IN VEHICLE AND METHOD FOR CONTROLLING THE VEHICLE

(71) Applicant: LG Electronics Inc., Seoul (KR)

(72) Inventors: Yongsoo Park, Seoul (KR); Kwangsik Kong, Seoul (KR); Dongkyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/030,017

(22) Filed: Jul. 9, 2018

(65) Prior Publication Data

US 2019/0204840 A1 Jul. 4, 2019

(30) Foreign Application Priority Data

Jan. 2, 2018 (KR) ........................ 10-2018-0000325

(51) Int. Cl.
*G05D 1/02* (2020.01)
*G01C 21/36* (2006.01)
(Continued)

(52) U.S. Cl.
CPC ........... *G05D 1/0212* (2013.01); *B60W 30/00* (2013.01); *G01C 21/3667* (2013.01);
(Continued)

(58) Field of Classification Search
CPC ... G05D 1/0212; G06F 16/29; G06F 16/9537; G06F 3/04842; G01C 21/3667; H04W 4/40
See application file for complete search history.

(56) References Cited

U.S. PATENT DOCUMENTS 9,371,007 B1 6/2016 Penilla et al.
2015/0123619 A1* 5/2015 Marathe ................ B60L 3/0023
320/137
(Continued)

FOREIGN PATENT DOCUMENTS

JP 2013186519 9/2013
KR 20040089572 10/2004
(Continued)

*Primary Examiner* — Rodney A Butler
(74) *Attorney, Agent, or Firm* — Fish & Richardson P.C.

(57) ABSTRACT

A vehicle control device includes: a communication unit; a sensing unit configured to sense information associated with a vehicle; an output unit including at least one of a display unit or an audio output unit; at least one processor; and a computer-readable medium coupled to the at least one processor having stored thereon instructions which causes the at least one processor to perform operations including: receiving, through the communication unit, first information associated with charging stations from a first external device and second information associated with a driver of the vehicle from a second external device different from the first external device; receiving, through the sensing unit, third information associated with the vehicle; generating fourth information associated with charging of the vehicle based on at least one of the first information, the second information, or third information; and outputting, through the communication unit or the output unit, the fourth information.

19 Claims, 17 Drawing Sheets

(51) Int. Cl.
*G06F 16/29* (2019.01)
*G06F 16/95* (2019.01)
*H04W 4/02* (2018.01)
*B60W 30/00* (2006.01)
*G06F 16/9537* (2019.01)
*H04W 4/029* (2018.01)
*H04W 4/021* (2018.01)
*H04W 4/024* (2018.01)
*H04W 4/40* (2018.01)
*G06F 3/0484* (2013.01)
*H04W 4/44* (2018.01)

(52) U.S. Cl.
CPC .......... *G06F 16/29* (2019.01); *G06F 16/9537* (2019.01); *H04W 4/021* (2013.01); *H04W 4/024* (2018.02); *H04W 4/029* (2018.02); *G06F 3/04842* (2013.01); *H04W 4/40* (2018.02); *H04W 4/44* (2018.02)

(56) References Cited

U.S. PATENT DOCUMENTS

| | | |
|---|---|---|
| 2017/0123421 A1 | 5/2017 | Kentley et al. |
| 2018/0257473 A1* | 9/2018 | Follen .................... B60K 6/22 |
| 2018/0281612 A1* | 10/2018 | Perry ................ G01C 21/3614 |

FOREIGN PATENT DOCUMENTS

| | | |
|---|---|---|
| KR | 101111733 | 2/2012 |
| KR | 20130082957 | 7/2013 |

* cited by examiner

FIG. 1
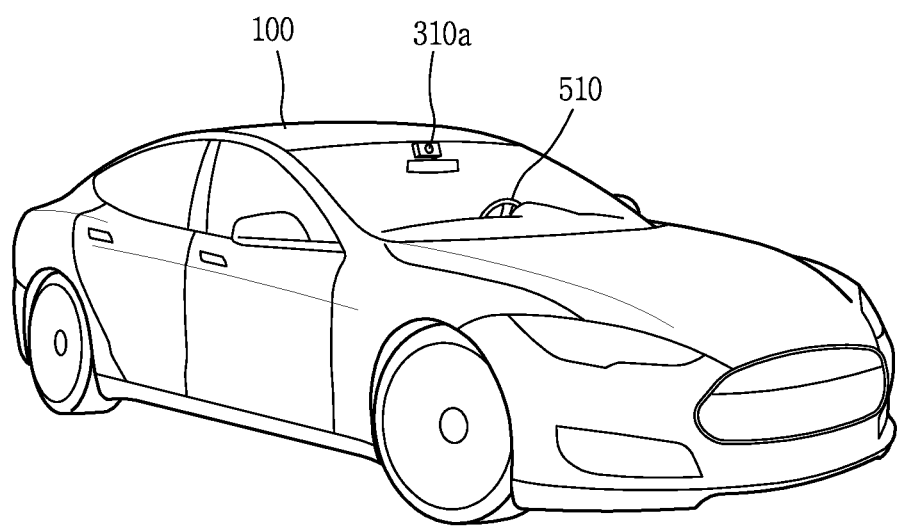
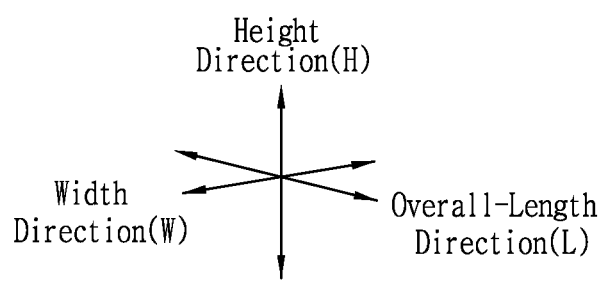

FIG. 9
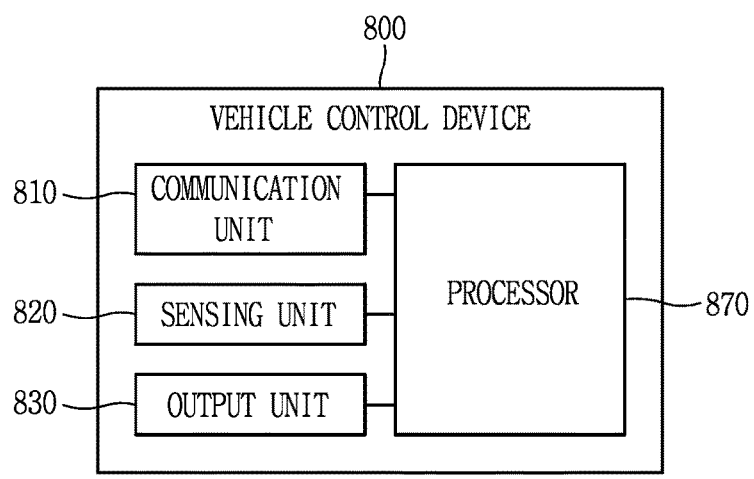
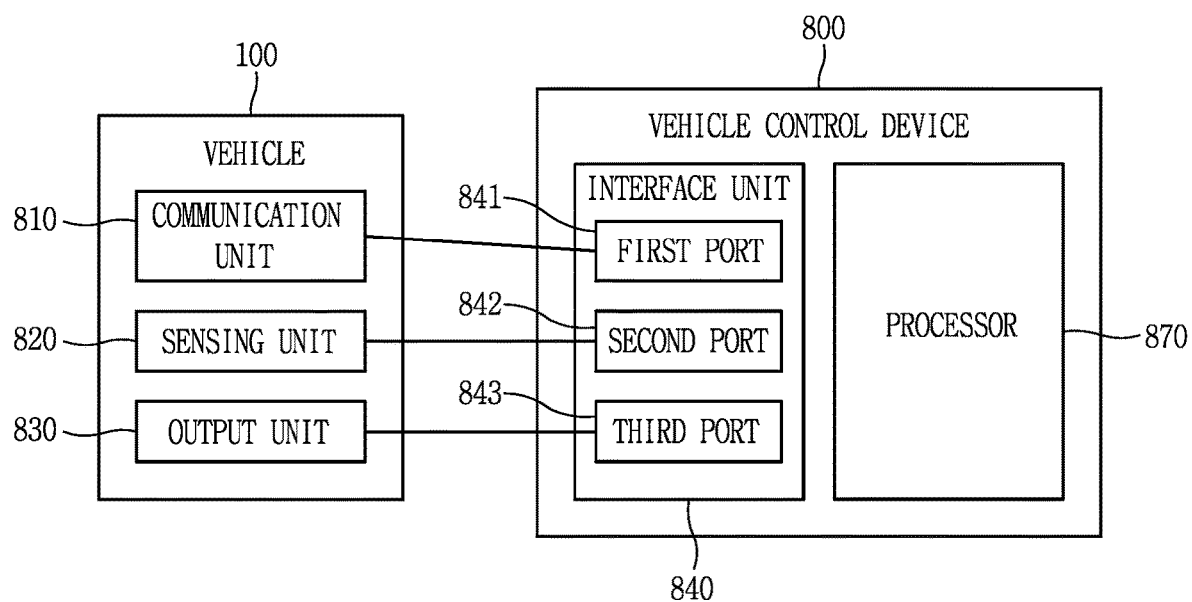

FIG. 16

| Settings |
|---|
| Filters |
| ☑ DISTANCE(km) |
| ☑ SUPPORT FOR METHOD OF CHARGING MY VEHICLE |
| ☑ NUMBER OF CHARGERS AVAILABLE/TOTAL NUMBER OF CHARGERS |
| ☑ ESTIMATED WAITING TIME/CHARGING TIME |
| ☑ SUPPORT FOR FAST CHARGING |
| ☑ ESTIMATED FEES (UPON COMPLETION OF CHARGING) |
| ☑ SUPPORT FOR CAR-SHARING SERVICE/FEES |
| ☑ OFFICIAL CHARGING STATIONS |
| ☑ NON-OFFICIAL CHARGING STATIONS |
| ☑ SUPPORT FOR COMPLETION-OF-CHARGING REMINDER SERVICE |

| | DISTANCE (km) | CHARGING METHOD (SOCKET) | NUMBER OF CHARGERS AVAILABLE /TOTAL NUMBER OF CHARGERS | ESTIMATED WAITING TIME/ CHARGING TIME | SUPPORT FOR FAST CHARGING | ESTIMATED FEES | SUPPORT FOR CAR-SHARING SERVICE/ FEES | OFFICIAL CHARGING STATIONS | SUPPORT FOR COMPLETION-OF-CHARGING REMINDER SERVICE |
|---|---|---|---|---|---|---|---|---|---|
| SERVICE AREA A | 1.5 | Type1 | 4/10 | 0/2 hr | ✓ | 15,000 | 5,000/1H | ✓ | ✓ |
| SERVICE AREA B | 2.5 | Type1 | 2/6 | 0/2 hr | ✓ | 15,100 | | ✓ | ✓ |
| SERVICE AREA C | 3.1 | Type1 | 0/5 | 30 mins /2 hr | ✓ | 15,500 | | ✓ | ✓ |
| SERVICE AREA D | 3.7 | Type1 | 0/5 | 1 hr /6 hr | | 16,700 | 7,000/1H | | ✓ |

VEHICLE CONTROL DEVICE MOUNTED IN VEHICLE AND METHOD FOR CONTROLLING THE VEHICLE

CROSS-REFERENCE TO RELATED APPLICATION

Pursuant to 35 USC § 119 (a), this application claims the benefit of an earlier filing date and priority to Korean Application No. 10-2018-0000325, filed on Jan. 2, 2018, the contents of which are incorporated by reference herein in its entirety.

TECHNICAL FIELD

The present disclosure relates to a vehicle control device mounted in a vehicle and a method for controlling the vehicle.

BACKGROUND

A vehicle is an apparatus configured to move a user in the user's desired direction. A representative example of a vehicle may be an automobile. Various types of sensors and electronic devices may be provided in the vehicle to enhance user convenience. For example, an Advanced Driver Assistance System (ADAS) is being actively developed for enhancing the user's driving convenience and safety. In addition, autonomous vehicles are being actively developed.

Various services and charging systems related to electric vehicle charging are being actively developed in connection with the active development of electric vehicles. Charging of electric vehicles typically take a substantial amount of time, ranging from tens of minutes to several hours.

SUMMARY

In one aspect, a vehicle control device includes: an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit; at least one processor; and a computer-readable medium coupled to the at least one processor having stored thereon instructions which, when executed by the at least one processor, causes the at least one processor to perform operations including: receiving, through the communication unit, first information associated with charging stations from a first external device and second information associated with a driver of the vehicle from a second external device different from the first external device; receiving, through the sensing unit, third information associated with the vehicle; generating fourth information associated with charging of the vehicle based on at least one of the first information, the second information, or third information; and outputting, through the communication unit or the output unit, the fourth information.

Implementations may include one or more of the following features. For example, outputting, through the communication unit or the output unit, the fourth information can include: determining, through the sensing unit, whether the driver is inside the vehicle; based on a determination that the driver is inside the vehicle, outputting, through the communication unit, the fourth information associated with charging of the vehicle to the output unit; and based on a determination that the driver is not inside the vehicle, transmitting, through the communication unit, the fourth information to the second external device.

In some implementations, the first information associated with charging stations includes at least one of: a distance between a current location of the vehicle and each of the charging stations, a charging method of each of the charging stations, a number of chargers available at each of the charging stations, a charging power of the chargers at each of the charging stations, services available at each of the charging stations, or an estimated time of completing charging of the vehicle at each of the charging stations. The second information associated with the driver can include schedule information associated with the driver and available on the second external device. The third information associated with the vehicle can include at least one of: route information configured to guide the vehicle to a destination, a charging method of the vehicle, or an amount of power required to charge the vehicle.

In some implementations, the fourth information associated with charging of the vehicle includes at least one of: at least one graphical object configured to represent the one or more charging stations accessible by the vehicle from a preset route of the vehicle based on the route information, a distance between the vehicle and the second external device, a speed of movement of the second external device, an estimated time of completing charging of the vehicle, a departure time for the driver to begin returning to the charging station to arrive at the charging station at the estimated time of completing charging of the vehicle, the driver's estimated time of return to the charging station, information associated with an estimated amount of power needed to charge the vehicle, information associated with at least one car-sharing service, information associated with public transportation to reach the destination, or information associated with services available at the charging station.

In some implementations, the operations include: displaying, through the display unit, map information and preset route information associated with a preset route of the vehicle; determining, based on the first, second, and third information, one or more charging stations accessible by the vehicle from the preset route of the vehicle; and displaying, on the map information, at least one graphical object configured to represent the one or more charging stations accessible by the vehicle from the preset route of the vehicle.

In some implementations, the operations include: receiving a selection of a graphical object from the at least one graphical object; based on the receipt of the selection, displaying, through the display unit, a portion of the first information corresponding to a charging station represented by the selected graphical object; and transmitting, through the communication unit, a charging reservation request to a server associated with the selected charging station.

In some implementations, the operations include: determining that the vehicle is being charged; and based on the determination that the vehicle is being charged, transmitting, through the communication unit, the fourth information associated with charging of the vehicle to the second external device.

In some implementations, the operations include: receiving, through the communication unit, location information of the second external device; and determining a distance between the vehicle and the second external device based on the location information of the second external device.

In some implementations, a location of the second external device corresponds to the location of the driver, and the operations include: calculating a departure time for the driver to begin returning to the charging station based on the distance between the vehicle and the second external device, a speed of movement of the second external device, and an estimated time of completing charging of the vehicle; and transmitting, through the communication unit, the departure time to the second external device.

In some implementations, calculating a departure time for the driver to begin returning to the charging station includes: subtracting an estimated travel time between the location of the second external device and the charging station from the estimated time of completing charging of the vehicle.

In some implementations, the operations include: determining an estimated time of return to the charging station by the driver based on the second information associated with the driver; and transmitting, through the communication unit to the second external device, information associated with an expected charging level of the vehicle at the driver's estimated time of return.

In some implementations, the operations include: determining that the vehicle is being charged; determining that the distance between the vehicle and the second external device is greater than or equal to a reference distance; and based on the determination that (i) the vehicle is being charged, and (ii) the distance between the vehicle and the second external device is greater than or equal to a reference distance: transmitting, through the communication unit, fourth information associated with charging of the vehicle, and performing a preset control associated with the vehicle.

In some implementations, the preset control associated with the vehicle includes at least one of: locking doors of the vehicle, receiving images through a camera mounted in the vehicle, or outputting an audible alert if other users approach within a given distance of the vehicle.

In some implementations, the operations include: determining, based on the first, second, and third information, that an estimated time of completing charging of the vehicle at one of the charging stations is later than a scheduled charging completion time of the driver; and based on the determination that the estimated time of completing charging of the vehicle at one of the charging stations is later than the scheduled charging completion time of the driver, outputting, through the output unit, information associated with use of a temporary vehicle through a car-sharing service provided by the charging station.

In some implementations, the operations include: receiving a user request for a car-sharing service; based on the receipt of the user request, receiving, through the communication unit, an authority to control a selected vehicle from the first external device; transmitting, through the communication unit, the received authority to control the selected vehicle to the second external device; and transmitting, through the communication unit, fifth information to the selected vehicle, the fifth information including at least a portion of the third information associated with the vehicle.

In some implementations, the fifth information is configured to control the selected vehicle such that route information of the selected vehicle matches the route information of the vehicle based on the at least a portion of the third information.

In some implementations, the operations include: determining, based on the first, second, and third information, that an estimated time of completing charging of the vehicle at one of the charging stations is later than a scheduled charging completion time of the driver; and based on the determination that the estimated time of completing charging of the vehicle at one of the charging stations is later than the scheduled charging completion time of the driver, outputting, through the output unit, information associated with use of a public transportation to reach the user's destination from the charging station.

In some implementations, the operations include: determining that (i) the charging of the vehicle is complete, or (ii) a remaining time to complete charging of the vehicle is less than a reference time; and based on the determination that (i) the charging of the vehicle is complete, or (ii) the remaining time to complete charging of the vehicle is less than the reference time, performing at least one of: outputting, through the output unit, information associated with services available at the charging station based on the first information associated with the charging station, or transmitting, through the communication unit, the information associated with services available at the charging station to the second external device.

In some implementations, the operations include: determining, based on the second information associated with the driver, a first time period during which the driver is not scheduled to use the vehicle; and controlling the vehicle to autonomously drive to a first charging station, charge the vehicle at the first charging station, and autonomously drive back to a location of the driver within the first time period.

In another aspect, a vehicle includes: a plurality of wheels; a power source configured to drive at least one of the plurality of wheels; and the vehicle control device.

In some scenarios, according to some implementations of the present disclosure, one or more of the following effects may be achieved.

Firstly, a user interface that allows the driver to select suitable charging station based on charging station information, driver information, and vehicle information may be provided.

Second, when the vehicle is being charged, a user interface may inform the driver of a suitable time to return to the vehicle based on the distance between the driver's location and the vehicle.

Third, a user interface may provide various services to help the driver arrive at his or her destination in a timely manner even in situations where the estimated time of completing charging of the vehicle is later than the time when the vehicle is needed by the driver.

Advantages of the present disclosure should not be limited to the aforementioned advantages and other unmentioned advantages will be clearly understood by those skilled in the art from the claims. The details of one or more implementations are set forth in the accompanying drawings and the description below. Other features will be apparent from the description and drawings, and from the claims. The description and specific examples below are given by way of illustration only, and various changes and modifications will be apparent

BRIEF DESCRIPTION OF THE DRAWINGS

FIG. 1 is a diagram illustrating an example of an exterior of a vehicle;

FIG. 9 is a bock diagram illustrating a vehicle control device according to an implementation of the present disclosure; and FIGS. 10, 11, 12, 13A, 13B, 14, 15, 16, and 17 are flowcharts and diagrams illustrating various implementations of the present disclosure.

DETAILED DESCRIPTION

Figure 2:
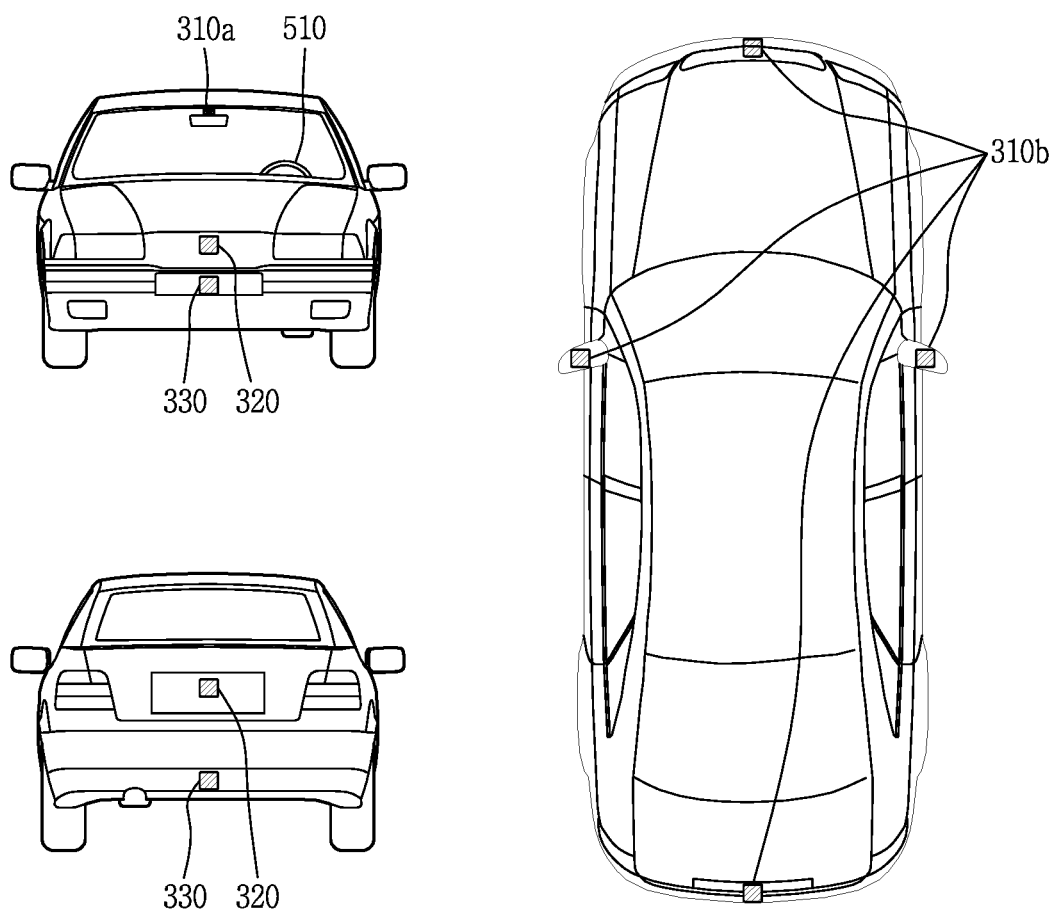
FIG. 2 is a diagram illustrating an example of a vehicle at various angles.

As charging of electric vehicles typically takes a substantial amount of time, vehicle control methods and technology directed to addressing the charging time, and improving efficiency or usability of the time during charging of the vehicle may be desired. For example, services available at an electric vehicle charging station may be differentiated from services available at conventional gas stations to address issues related to electric vehicles. User experience in charging of electric vehicles may be improved, for example, by guiding the driver of the vehicle to an electric vehicle charging station that satisfies the needs of the driver. A user interface (UI) may be provided to improve user experience.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

In the following description, a left side of a vehicle refers to a left side in a driving direction of the vehicle, and a right side of the vehicle refers to a right side in the driving direction.

Figure 3:
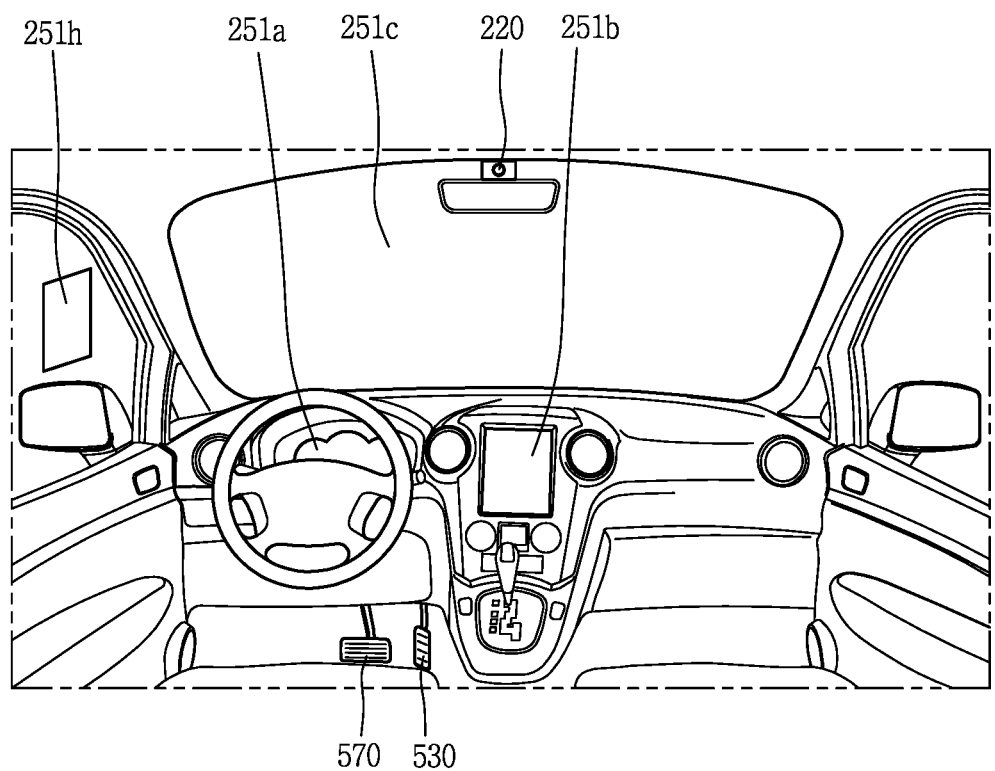
FIGS. 3 and 4 are views illustrating an interior portion of an example of a vehicle.
Figure 4:
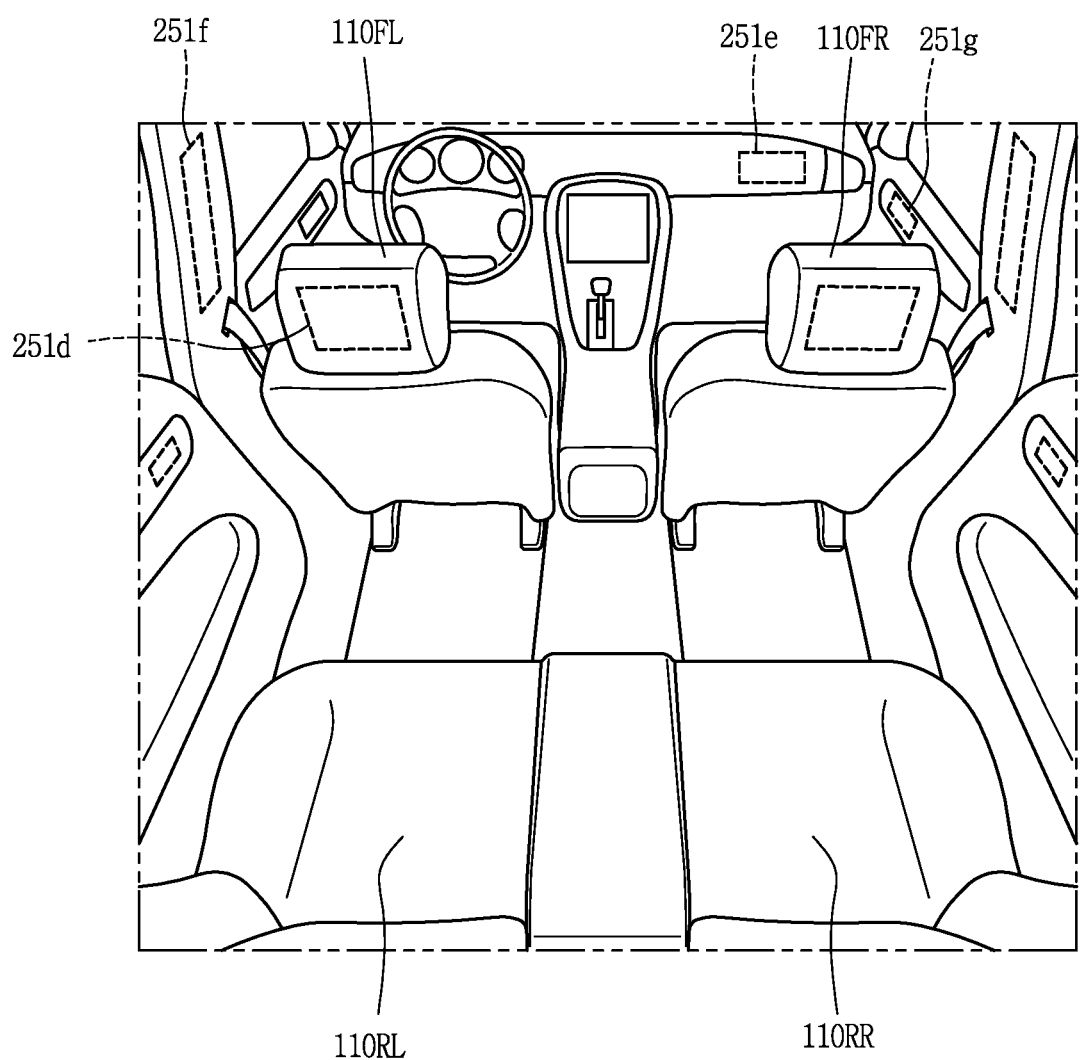

FIG. 1 illustrates an example of an exterior of a vehicle; FIG. 2 illustrates an example of a vehicle at various angles; and FIGS. 3 and 4 illustrate an interior portion of an example of a vehicle.

Figure 5:
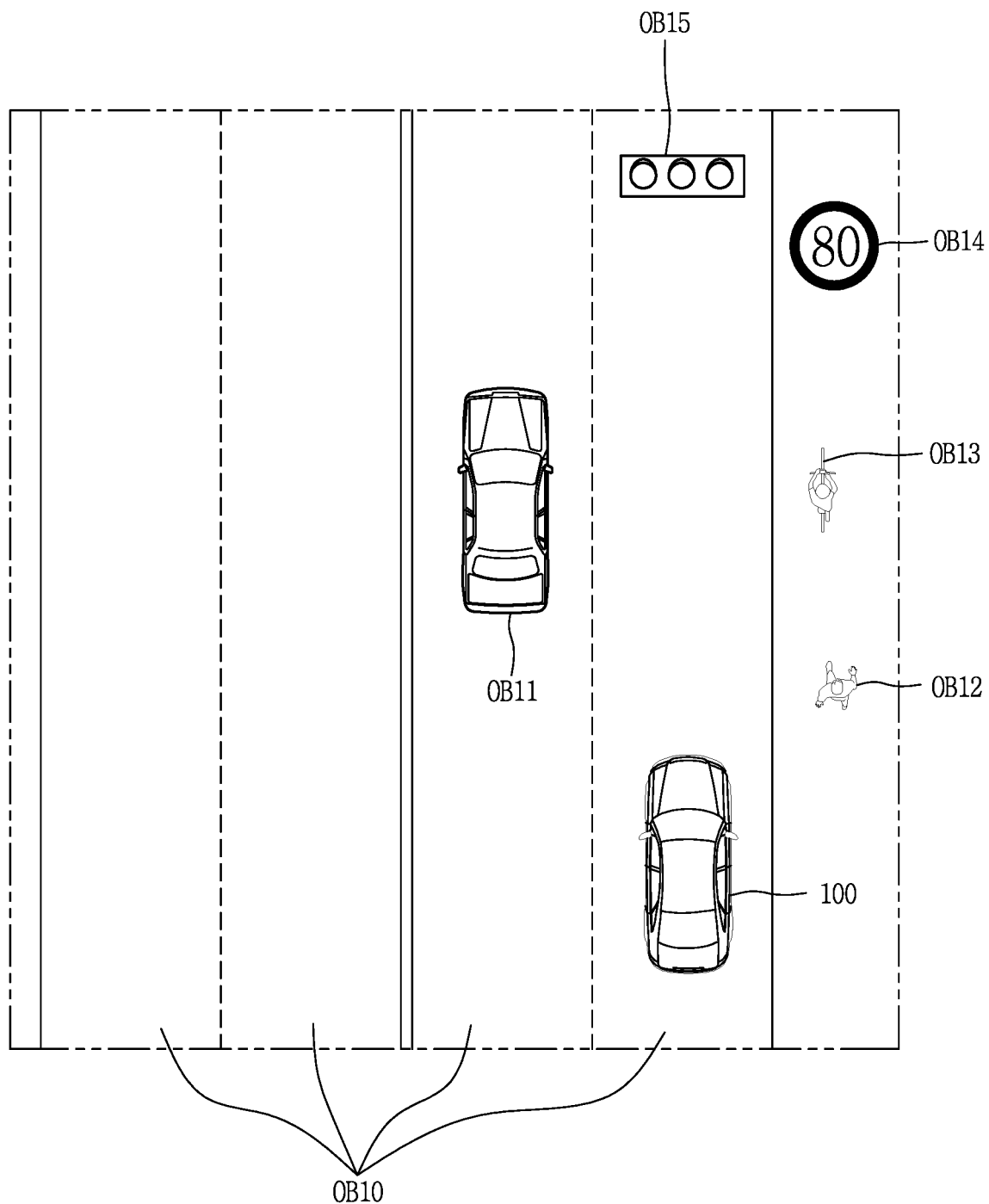
FIGS. 5 and 6 are reference views illustrating examples of objects that are relevant to driving.
Figure 6:
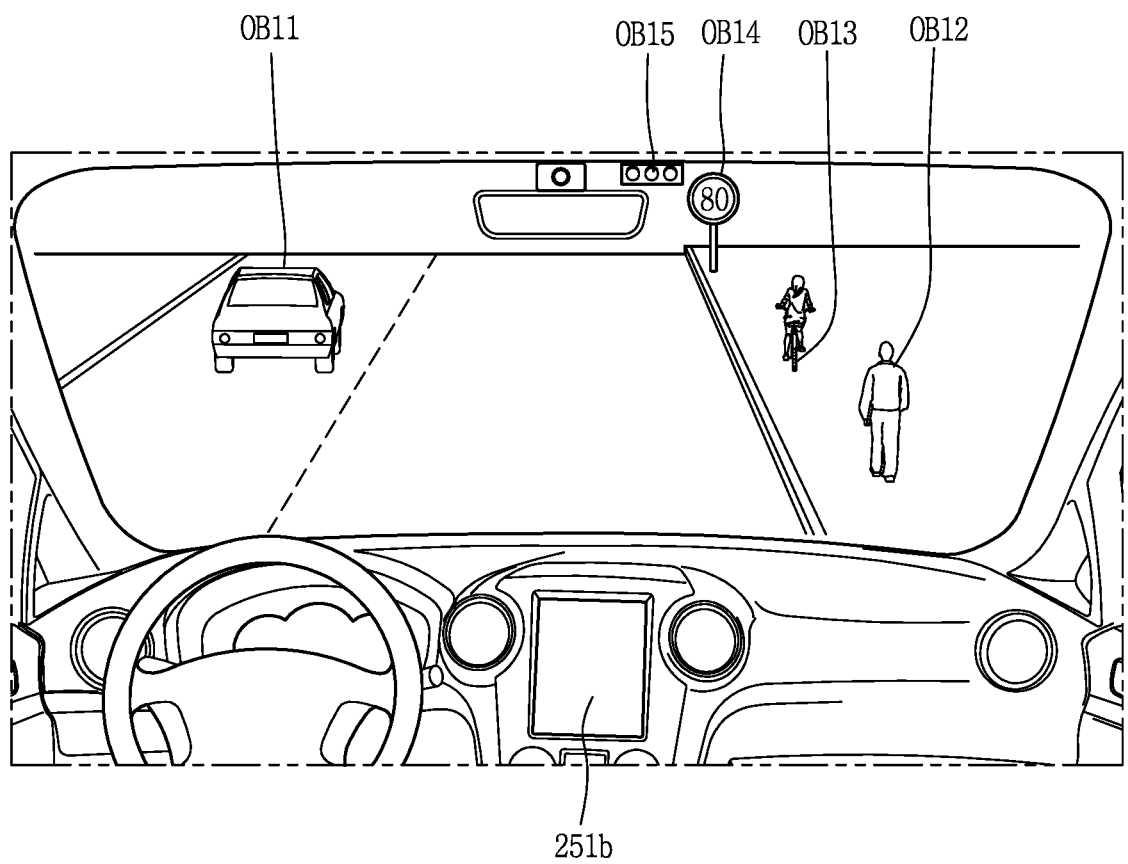
Figure 7:
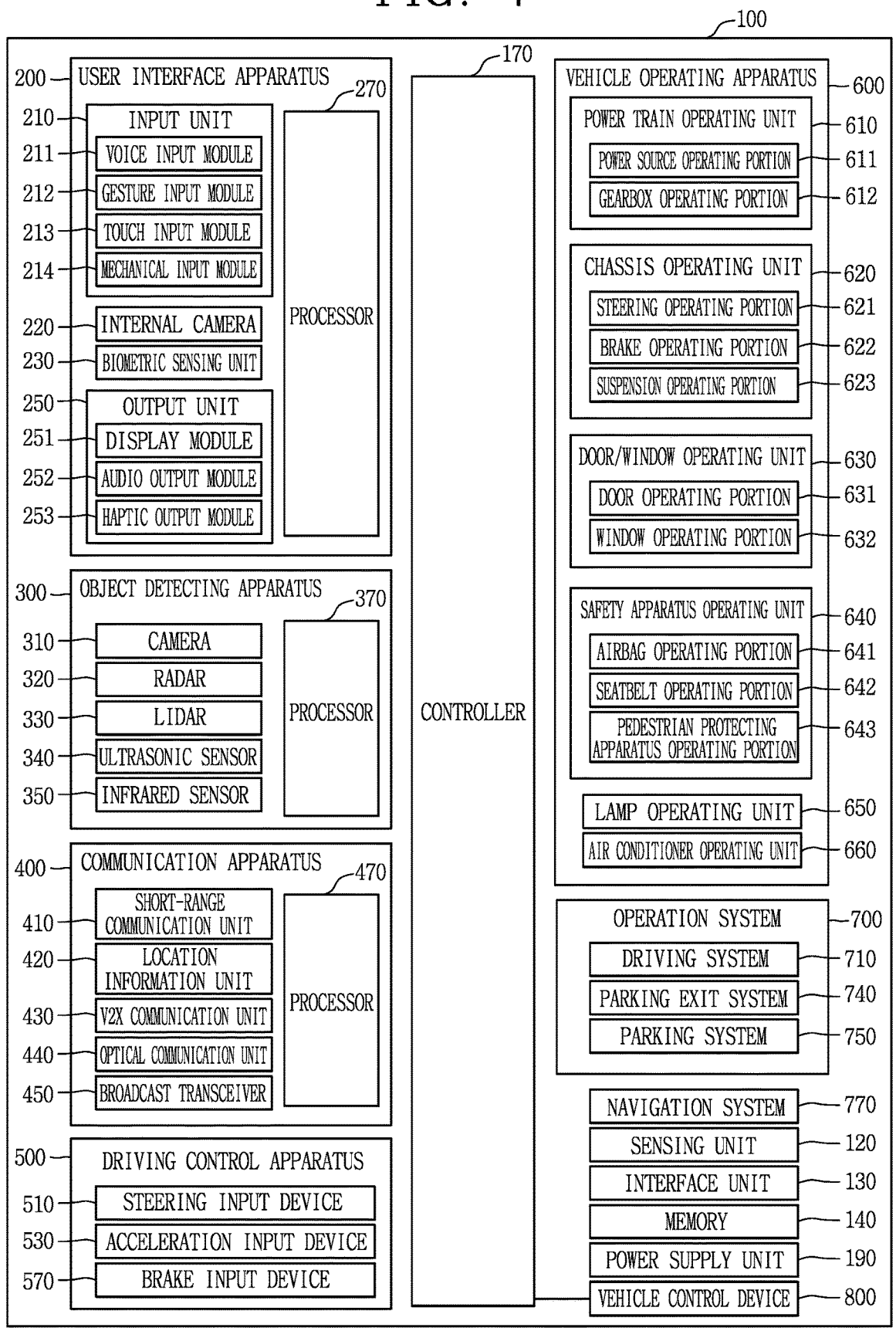
FIG. 7 is a block diagram illustrating subsystems of an example of a vehicle.

FIGS. 5 and 6 illustrate examples of objects that are relevant to driving; and FIG. 7 illustrates subsystems of an example of a vehicle.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image that is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may include left and right lines forming a lane.

The other vehicle OB11 may be a vehicle that is moving around the vehicle 100. The other vehicle OB11 may be a vehicle located within a predetermined distance from the vehicle 100. For example, the other vehicle OB11 may be a vehicle that moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

In some implementations, objects may be classified into a moving object and a fixed object. For example, the moving object may include another vehicle and a pedestrian. The fixed object may include a traffic signal, a road and a structure, for example.

The object detecting apparatus 300 may include a camera 310, a radar 320, a LiDAR 330, an ultrasonic sensor 340, an infrared sensor 350 and a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object, which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects that are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave in which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam in which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave in which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to implementations, the operation system 700 may further include other components in addition to components to be described, or may not include some of the components to be described.

In some implementations, the operation system 700 may include a processor. Each unit of the operation system 700 may individually include a processor.

According to implementations, the operation system may be implemented by the controller 170 when it is implemented in a software configuration.

In some implementations, according to implementation, the operation system 700 may include at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit may supply power required for an operation of each component according to the control of the controller 170. For example, the power supply unit may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), at least one processor, controllers, micro controllers, microprocessors, and electric units performing other functions.

In some implementations, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

In some implementations, the vehicle control device 800 described herein may include various types of devices configured to control the vehicle, and may be, for example, a mobile terminal. When the vehicle control device 800 is a mobile terminal, the mobile terminal and the vehicle 100 may be connected to each other so as to perform communication in a wired/wireless manner. In addition, the mobile terminal may control the vehicle 100 in various ways in a communication-connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. For example, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an implementation of the present disclosure with reference to the accompanying drawings.

Figure 8:
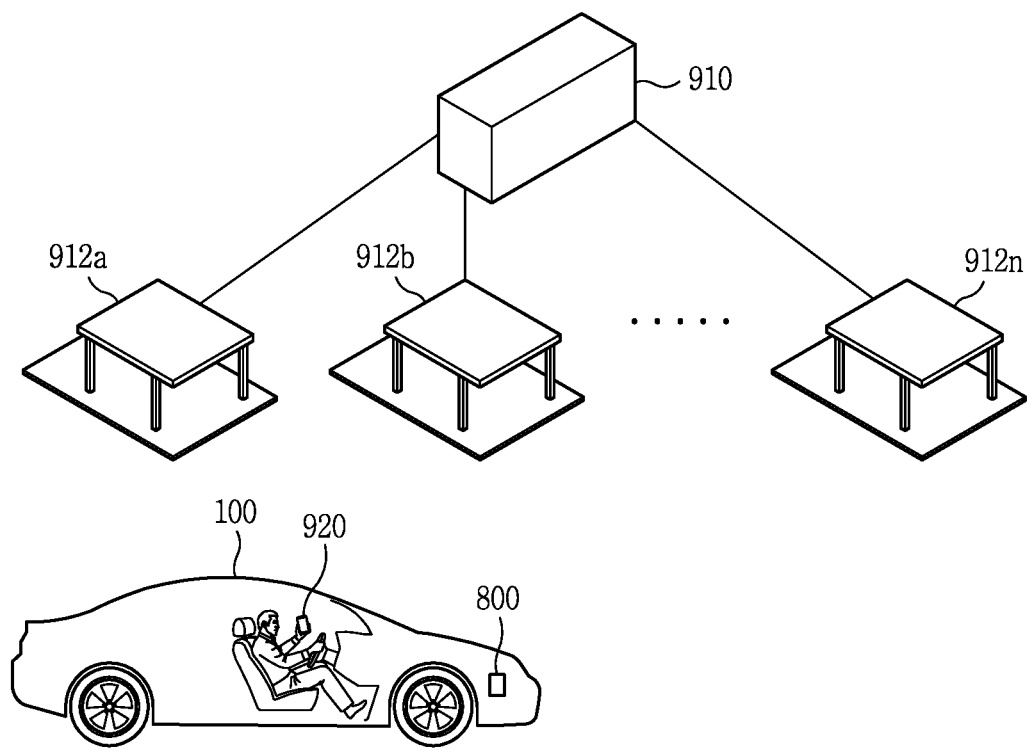
FIG. 8 is a diagram illustrating a system according to an implementation of the present disclosure.

FIG. 8 is a diagram illustrating a system according to an implementation of the present disclosure.

Referring to FIG. 8, the present disclosure provides a system configured to charge a vehicle in an improved manner.

As used herein, the vehicle may be an electric vehicle powered by and run on electricity. However, what is described in this specification may apply to other types of vehicles, including gasoline vehicles, diesel vehicles, hydrogen vehicles, and solar vehicles.

The system of this disclosure may include a first external device 910, a second external device 920, and a vehicle 100.

The first external device 910 may be an integrated server (or a server) configured to manage information relating to at least one charging station (or gas station) and control chargers mounted in the at least one charging station 912a, 912b, . . . , 912n.

Also, the first external device 910 may be a server that is mounted for each of the charging stations 912a, 912b, . . . 912n and configured to control components (e.g., chargers, a car wash, etc.) mounted in each charging station.

For example, the first external device 910 may be at least one between a server mounted for each charging station 912a, 912b, . . . 912n and an integrated server that manages the servers in an integrated fashion.

The first external device 910 may have a communication device configured to communicate with the second external device 920 or a vehicle controller 800 (or the vehicle 100).

The second external device 920 may be a mobile terminal owned by the driver.

The mobile terminal described in this specification may include a mobile phone, a smart phone, a laptop computer, a PDA (personal digital assistant), a PMP (portable multimedia player), a navigation device, a slate PC, a tablet PC, an ultrabook, a wearable device (e.g., a smartwatch, smart glasses, and an HMD (head mounted display), etc.

The second external device 920 may include a wireless communication unit, an input unit, a sensing unit, an output unit, an interface unit, a memory, a control unit, and a power supply unit.

More specifically, the wireless communication unit, among the above components, may include one or more modules that enable wireless communication between the second external device 920 and a wireless communication system, between the external device 920 and another second external device 920, or between the second external device 920 and an external server. Further, the wireless communication unit may include one or more modules that connect the second external device 920 to one or more networks.

The wireless communication unit may include at least one among a broadcast receiving module, a mobile communication module, a wireless internet module, a short-range communication module, or a location information module.

The second external device 920 may receive a broadcast through the wireless communication unit, send and receive a wireless signal over a communication network using wireless internet technologies, or perform short-range communication.

Moreover, the second external device 920 may acquire the location (or current location) of the second external device 920 through the wireless communication unit—for example, a GPS (global positioning system) module or WiFi (wireless fidelity) module.

The input unit may include a camera or image input unit for image signal input, a microphone or audio input unit for audio signal input, and a user input unit (e.g., a touch key, a push key (mechanical key), etc.) for receiving information from the user. Voice data or image data collected by the input unit may be analyzed and processed as a control command from the user.

The sensing unit may include one or more sensors for sensing at least one among information in the mobile terminal, information on the environment surrounding the mobile terminal, and user information. For example, the sensing unit may include at least one among a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera), a microphone, a battery gauge, an environment sensor (for example, a barometer, a hygrometer, a thermometer, a radiation sensor, a heat sensor, a gas sensor, etc.), and a chemical sensor (for example, an electronic nose, a healthcare sensor, a bio recognition sensor, etc.). In some implementations, the mobile terminal disclosed in this specification may make use of a combination information sensed by at least two of these sensors.

The output unit generates output related to a visual, auditory, or tactile sense, and may include at least one among a display unit, an audio output unit, a haptic module, and an optical output unit. The display unit may implement a touchscreen by forming an interlayer with a touch sensor or by being integrated with it. This touch screen may function as a user input unit that provides an input interface between the second external device and the user, and at the same time may provide an output interface between the second external device and the user.

The interface unit serves as a passage to various types of external devices connected to the second external device. This interface unit may include at least one among a wired/wireless headset port, an external charger port, a wired/wireless data port, a memory card port, a port for connecting a device having a user identification module, an audio I/O port, a video I/O port, and an earphone port. When an external device is attached to the interface, the second external device 920 may perform proper control related to the connected external device.

Moreover, the memory stores data that supports various functions of the second external device. The memory may store a plurality of application programs or applications running on the second external device 920 and data and commands for the operation of the second external device 920. At least some of these application programs may be downloaded from an external server via wireless communication. Also, some of these application programs may be present on the second external device 920 since shipment, for primary functions (e.g., receiving calls, making calls, and receiving and sending messages) of the second external device 920. In some implementations, the application programs may be stored in the memory, installed on the second external device 920, and run by the controller to perform the mobile terminal's operations (or functions).

The controller generally controls the overall operation of the second external device 920, besides the operations related to the application programs. The controller may provide or process proper information or functions to the user by processing input or output signals, data, information, etc. through the aforementioned components or running an application program stored in the memory.

Moreover, the controller may control at least some of the components of the second external device 920 in order to run an application program stored in the memory. Moreover, the controller may operate at least two of the components included in the second external device 920 in combination, in order to run the application program.

The power supply unit receives external power and internal power under control of the controller and supplies power to the components included in the second external device 920. This power supply unit includes a battery, and the battery may be an internal battery or replaceable battery.

At least some of the aforementioned components may operate in tandem with each other in order to implement the operation, control, or control method of the mobile terminal according to various implementations to be described below. Also, the operation, control, or control method of the second external device 920 (e.g., mobile terminal) may be implemented on the second external device 920 by running at least one application program stored in the memory.

The system of this disclosure is configured to communicate with the first external device 910 and the second external device 920, and may include a vehicle control device 800 configured to control the vehicle 100.

FIG. 9 is a block diagram illustrating a vehicle control device according to an implementation of the present disclosure.

The vehicle control device 800 related to the present disclosure may include a communication unit 810, a sensing unit 820, an output unit 830, and at least one processor 870.

The communication unit 810 may be the aforementioned communication device 400. To enable wireless communication to a device capable of communication that is internal or external to the vehicle, the communication unit 810 may be connected wirelessly to the device.

For example, the communication unit 810 may be connected to the first external device 910 (e.g., a server present in an electric charging station or an integrated server managing a plurality of servers).

The communication unit 810 and the first external device 910 connected to enable communication may send and receive data, information, control authority, control commands, control signals, etc.

In another example, the vehicle control device 800 (or the vehicle 100) and the second external device 920 may be connected to enable wireless communication through the communication unit 810. The vehicle control device 800 and the second external device 920 may be wirelessly connected to communicate with each other according to a user request, or, if the two have previously been connected (e.g., paired), may be automatically connected to wirelessly communicate with each other when the second external device 920 is present within the interior of the vehicle.

Moreover, the vehicle control device 800 and the second external device 920 may be wirelessly connected to communicate with each other when the second external device 920 is separated from the vehicle 100 by more than a certain distance.

This communication unit 810 may be mounted inside the vehicle (or vehicle control device), and may come in the form of a separate module to communicate (electrically connect) with a vehicle component.

The vehicle control device 800 may control the second external device 920 through the communication unit 810.

For example, the vehicle control device 800 may send a control signal for controlling the second external device 920 to the second external device 920 through the communication unit 810. Upon receiving the control signal, the second external device 920 may perform a function, an operation, a control or a combination thereof corresponding to the control signal.

In some situations, the present disclosure may allow the second external device 920 to control the vehicle control device 800 (or vehicle 100). For example, the second external device 920 may send a control signal for controlling the vehicle to the vehicle control device 800. In response to receiving the control signal, the vehicle control signal 800 may perform a function, an operation, a control or a combination thereof corresponding to the control signal sent from the second external device 920.

Moreover, the communication unit 810 may perform communication with an external device (e.g., external server, cloud server (or cloud), internet, etc.) present outside of the vehicle. In addition, the communication unit 810 may communicate with other vehicles.

The communication unit 810 may receive information associated with a destination from an external device or send information associated with a destination to an external device. Here, the information associated with a destination may include a captured image of the destination, the location of the destination, the type of the destination, information on a building if the destination is included in the building (for example, the structure of the building and information about stores on each floor), information on parking lots near the destination, and so on.

Moreover, the communication unit 810 may receive various information from an external device, including information on buildings situated within a certain distance from the vehicle, information on vacant lots, and information on parking lots.

Such information may be received as controlled by the processor 870 or as controlled by an external device, for example.

In addition, the communication unit 810 may receive location information of the vehicle 100. The communication unit 810 may determine the current location of the vehicle through the location information unit 420 or a V2X communication unit 430.

For example, the communication unit 810 may receive information about the current location of the vehicle using a GPS module included in the location information unit or receive information about the current location from other vehicles or an external device (e.g., infrastructure) through the V2X communication unit 430.

This communication unit 810 may be mounted inside the vehicle (or vehicle control device) or outside the vehicle, and may come in the form of a separate module to communicate (electrically connect) with a vehicle component.

The vehicle control device 800 related to the present disclosure may include a sensing unit 820. The sensing unit 829 may be the object detection device 300 explained in FIG. 7 or the sensing unit 120 mounted in the vehicle 100.

The sensing unit 820 may include a camera. The camera may include an internal camera configured to capture the inside of the vehicle and an external camera to capture the outside of the vehicle, for example.

The sensing unit 820 may sense the driver's gaze direction using the internal camera.

Also, the sensing unit 820 may capture the outside of the vehicle using the external camera.

In an example, the sensing unit 820 may be implemented as a combination of at least two among the camera 310, radar 320, lidar 330, ultrasonic sensor 340, infrared sensor 350, and sensing unit 120 included in the object detection device 300.

The sensing unit 820 may sense information associated with the vehicle 100 of this disclosure.

The information associated with the vehicle may be at least one between vehicle information (or the vehicle's driving condition) and information about the surroundings of the vehicle.

For example, the vehicle information may include the vehicle's driving speed, the vehicle's weight, the number of passengers in the vehicle, the vehicle's braking force, the vehicle's maximum braking force, the vehicle's driving mode (autonomous driving mode or manual driving mode), whether the user is in the vehicle or not, and information on the user (e.g., if the user is an authenticated user or not).

The information about the surroundings of the vehicle may include, for example, the condition of (force of friction on) the road surface where the vehicle is driving, weather, the distance to the vehicle ahead (behind), the relative speed of the vehicle ahead (or behind), the curvature of a curb on a lane where the vehicle is traveling, the brightness of the surroundings of the vehicle, information on an object present within a reference range (given range) of the vehicle, whether the object enters/leaves the given range, whether the user is in the surroundings of the vehicle, and information on the user (e.g., if the user is an authenticated user or not).

The information about the surroundings of the vehicle (or surrounding environment information) may include information on the outside of the vehicle (e.g., surrounding brightness, temperature, the location of the sun, and objects (humans, other vehicles, signs, etc.) around the vehicle, the type of the road surface where the vehicle is traveling, landmarks, line information, lane information), information required for autonomous driving/autonomous parking/automatic parking/manual parking modes.

The information about the surroundings of the vehicle may further include the distance from an object near the vehicle to the vehicle 100, the type of the object, a parking space where the vehicle can park, and objects (e.g., parking lanes, strings, other vehicles, walls, etc.) for identifying a parking space.

Moreover, the information associated with the vehicle may include whether the mobile terminal is placed on a mount inside the vehicle or not, whether the mobile terminal enters or is present inside the vehicle or not, whether the mobile terminal moves into or is within a certain distance from the vehicle, and whether the mobile terminal and the vehicle control device are connected for communication or not.

Information relating to the vehicle sensed by the sensing unit 820 may be used in the autonomous driving mode for autonomous vehicle driving. For example, the processor 870 may allow the vehicle to drive autonomously using the information relating to the vehicle sensed by the sensing unit 820.

Additionally, the sensing unit 820 may sense the remaining power of the battery mounted in the vehicle.

Furthermore, the sensing unit 820 may sense, determine, or figure out the distance the vehicle can travel (e.g., range of the vehicle) on the remaining battery power, based on operational status of various the components (e.g., operation of heating wires in seats, air conditioner, wipers, lamps, etc.).

Also, the vehicle control device 800 related to the present disclosure may include an output unit 830. The output unit 830 may be the output unit 250 explained in FIG. 7.

The output unit 830 may include at least one of the display unit 251 or the audio output unit 252.

Further, the output unit 830 may include an output unit mounted in the vehicle and an output unit of the second external device 920. For example, the output unit 830 may be mounted in the vehicle or in the second external device 920 connected for communication through the communication unit.

In an example, the output unit mounted in the vehicle may include the display unit 251, the audio output unit 252, and the haptic output unit 253. The display unit 251 and the audio output unit 252 may be mounted inside or outside the vehicle.

Further, the output unit 830 may include the output unit (e.g., a touchscreen, audio output unit, etc.) of the second external device 920 connected for communication through the communication unit 810.

In an example, upon receiving information from an external server, the processor 870 may output the information through the output unit of the second external device 920 by communicating through the communication unit 810.

The second external device 920 may be the second external device 920 present inside the vehicle or the second external device 920 present outside the vehicle.

In some situations, the second external device 920 may be a mobile terminal owned by the driver (or the vehicle owner), and the owner of the vehicle 100 may also be the owner of the mobile terminal.

In some situations, the second external device 920 may be a mobile terminal that is approved for communicating with (or has ever been connected to) this vehicle 100 (or vehicle control device). In this case, the owner of the second external device 920 may be a person different from the owner of the vehicle 100.

The display unit 251 may include an output unit (e.g., touchscreen) of the mobile terminal that can communicate with the communication device 400.

Further, the display unit 251 may include a transparent display. The transparent display may be attached to a windshield or a window. For example, the display unit 251 of the present disclosure may include a windshield and a window. In this specification, the outputting of some information (or a graphical object) from the processor 870 to the display unit 251 may include outputting the some information (or graphical object) to a windshield or outputting the some information (or graphical object) to a window.

Also, the display unit 251 may be disposed in an area of the steering wheel, an area 251*a*, 251*b*, and 251*e* of an instrument panel, an area 251*d* of a seat, an area 251*f* of each pillar, an area 251*g* of a door, an area of a center console, an area of a headlining, and an area of a sun visor, or may be implemented in an area 251*c* of the windshield or an area 251*h* of the window.

For example, the display unit 251 may include a cluster, a CID (center information display), a navigation device, and a HUD (head-up display).

The display unit 251 may implement a touchscreen by forming an interlayer with a touch sensor or by being integrated with it. This touch screen may function as an input unit 210 that provides an input interface between the vehicle 100 (or vehicle control device 800) and the user, and at the same time may provide an output interface between the vehicle 100 (or vehicle control device 800) and the user.

The processor 870 may output various information relating to the vehicle on the display unit 251. Also, the processor 870 may output the information relating to the vehicle at different positions on the display unit 251 depending on the type of the information relating to the vehicle.

Moreover, the processor 870 may output a graphical object to the display unit 251 in a preset manner, based on the location of the destination and the driver's gaze.

The display unit 251 may be a navigation system 770 (or navigation device). Also, the display unit 251 may include the navigation system 770.

Also, the vehicle control device 800 of this disclosure may include a processor 870 configured to control the communication unit 810, sensing unit 820, output unit 830, etc.

The processor 870 may receive first information associated with charging stations from the first external device (e.g., a server associated with charging stations) through the communication unit 810 and receive second information associated with the driver from a second external device (e.g., the driver's mobile terminal).

Also, the processor 870 may sense third information associated with the vehicle by the sensing unit 820.

The processor 870 may generate fourth information associated with vehicle charging, based on at least one of the first, second, or third information.

Hereinafter, a method for providing information associated with vehicle charging in various suitable ways for the driver will be described in more details with reference to the accompanying drawings.

FIGS. 10, 11, 12, 13A, 13B, 14, 15, 16, and 17 are flowcharts and diagrams illustrating various implementations of the present disclosure.

Figure 10:
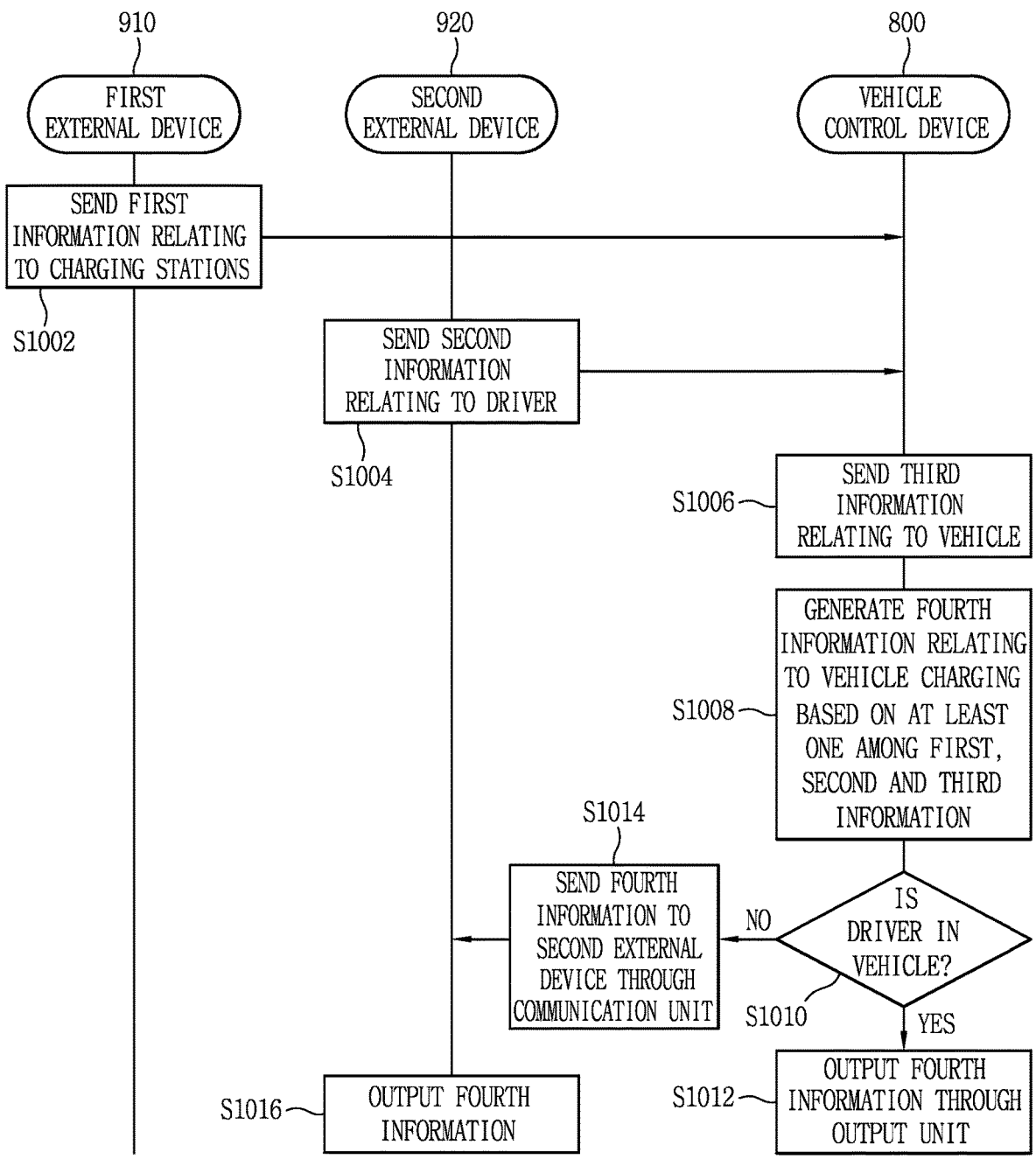

Referring to FIG. 10, if a preset condition is met, the processor 870 included in the vehicle control device 800 of this disclosure may receive first information associated with charging stations from the first external device 910 through the communication unit 810 (S1002) and receive second information associated with the driver from the second external device 920 (S1004).

The preset condition may include condition that requires charging of the vehicle—for example, when the remaining battery power of the vehicle is less than a reference value, when the battery power required for the vehicle to travel from the current location to a destination is larger than the current remaining battery power, or upon receiving a user request.

If the preset condition is met, the processor 870 may sense third information associated with the vehicle by the sensing unit 820 (S1006).

The first information relating to charging stations may include at least one of the following: distances between a current location of the vehicle and the charging stations, charging method of each of the charging stations, number of chargers available at each of the charging stations, charging power of the chargers, services available at each of the charging station, or estimated time of completing charging of vehicles being charged at the charging stations.

The second information relating to the driver may include schedule information associated with the driver. The schedule information may be available on the second external device. For example, the schedule information may be appointment information of a local or cloud-based calendar service.

The third information relating to the vehicle may include at least one of: route information configured to guide the vehicle on a route along which the vehicle can travel to the a destination, the method of charging the vehicle, the battery consumption rate, and the amount of power required to charge the vehicle (or the current remaining battery power of the vehicle).

The processor 870 may generate fourth information associated with charging of the vehicle based on at least one of the first information associated with charging stations received through the communication unit 810, the second information associated with the driver, and the third information associated with the vehicle sensed by the sensing unit 820 (S1008).

For example, the fourth information relating to vehicle charging may include at least one of the following: at least one graphical object configured to represent the one or more charging stations accessible by the vehicle from a preset route of the vehicle based on the route information, a distance between the vehicle and the second external device, a speed of movement of the second external device, an estimated time of completing charging of the vehicle, a departure time for the driver to begin returning to the charging station to arrive at the charging station at the estimated time of completing charging of the vehicle, the driver's estimated time of return to the charging station, information associated with an estimated amount of power needed to charge the vehicle, information associated with car-sharing service, information associated with public transportation to reach the destination, or information associated with services available at the charging station.

The fourth information associated with charging of the vehicle may include various types of information the processor 870 outputs to the output unit 830 or sends (e.g., transmits through a communication unit) to the second external device.

The fourth information relating to vehicle charging will be described in more details with reference to the accompanying drawings.

When the fourth information is generated, the processor 870 may sense by the sensing unit 820 whether the driver is in the vehicle or not (S1010).

For example, the processor 870 may output the fourth information relating to vehicle charging to the output unit 830 or control the communication unit 810 to output the fourth information to the second external device, based on whether the driver is in the vehicle or not. The presence of the driver in the vehicle may be determined, for example, through the sensing unit 820. For example, if the driver is in the vehicle, the processor 870 may output the generated fourth information relating to vehicle charging through the output unit 830 mounted in the vehicle (S1012).

In another example, if the driver is not in the vehicle, the processor 870 may send the fourth information relating to vehicle charging to the second external device 920 through the communication unit 810 so that it can be output by the second external device 920 (S1014).

In this case, the output unit of the second external device 920 may output the fourth information relating to vehicle charging.

The fourth information relating to vehicle charging may be generated based on the first, second, and third information. In an example, the present disclosure may provide information indicating the most suitable charging station by comprehensively taking into account information relating to charging stations, information relating to the driver, and information relating to the vehicle.

In this case, the present disclosure may output information indicating a charging station through an output unit mounted in the vehicle or to the driver's mobile terminal (e.g., the second external device), depending on whether the driver is in the vehicle or not.

Figure 11:
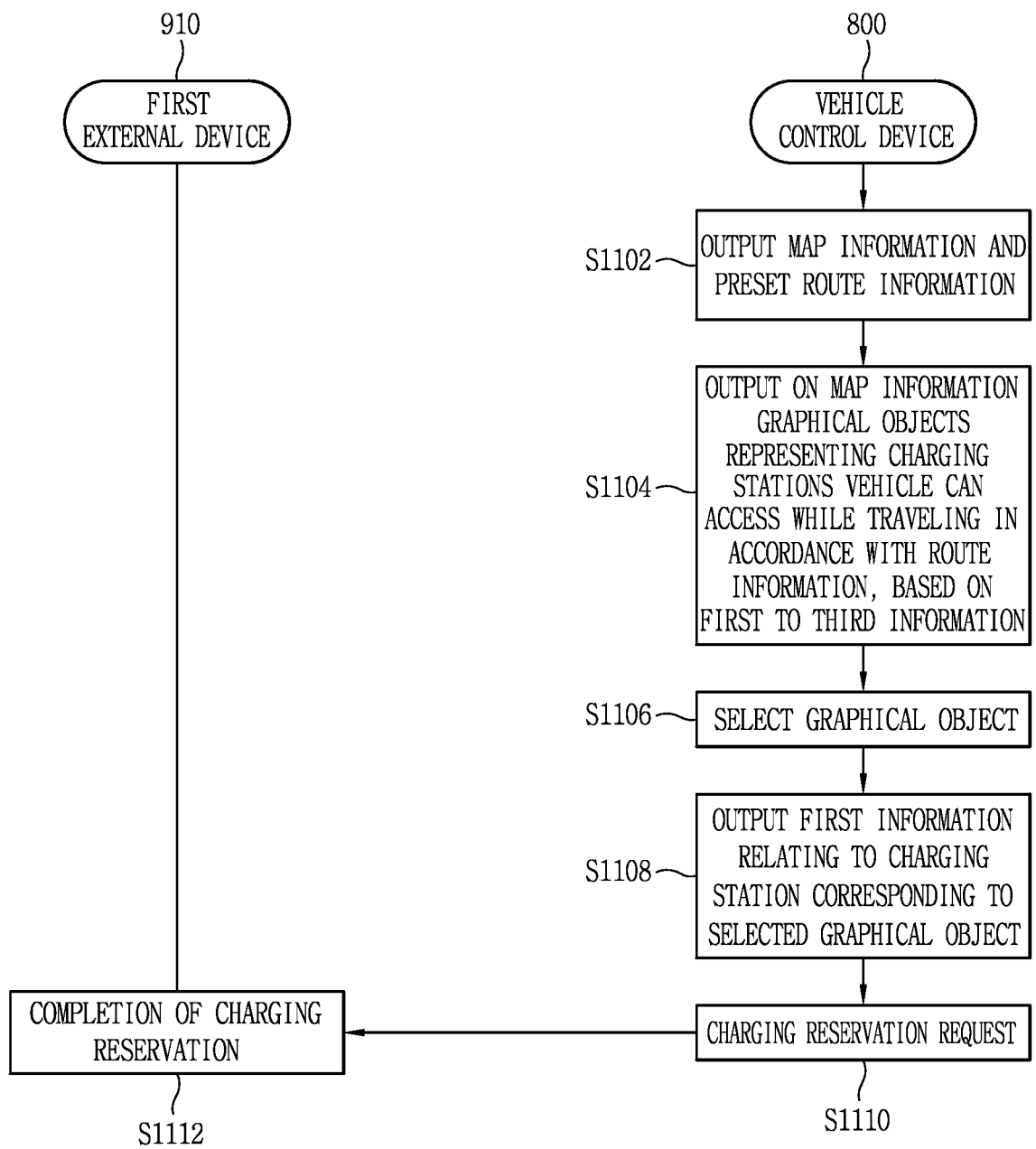

In some implementations, referring to FIG. 11, the processor 870 may display map information and preset route information on the display unit 251 of the output unit 830 (S1102).

Once a destination is set upon a user request, the processor 870 may configure information on a route along which the vehicle can travel to the destination from the current location and output this route information on the map information.

The processor 870 may output on the map information at least one graphical object representing charging stations the vehicle can access while traveling in accordance with the route information, based on the first, second, and third information (S1104).

In an example, if a preset condition is met (for example, the battery power required to travel to the destination is greater than the current battery power remaining) or a user request is received, the processor 870 may search for at least one charging station and output a graphical object representing a found charging station on the map information, based on the first, second, and third information.

In this case, the processor 870 may selectively output a graphical object representing a charging station the vehicle can access while traveling in accordance with the route information.

The charging station the vehicle can access while traveling in accordance with the route information may be a charging station the vehicle can access without deviating from the route corresponding to the route information (e.g., without a U-turn, a left turn, or a right turn). Such charging station may be referred to as charging stations accessible by the vehicle from the preset route. As another example, as accessible charging station may be a charging station that can be reached from the preset route by a detour that satisfy preset criteria. Examples of the preset criteria include a detour distance being less than a preset distance, or a detour travel time being less than a preset time.

The charging station selected based on the first, second, and third information may be a charging station that is determined by applying the remaining battery power of the vehicle, the distance between the charging station and the vehicle, the vehicle battery consumption rate, the charging rate, the charging time, and the driver's schedule to a preset algorithm.

For example, the charging station selected based on the first, second, and third information may be a charging station where charging can be completed before the driver's scheduled time or a charging station where the time it takes to charge the battery as required to travel to the destination plus the time it takes to travel from the charging station to the destination is earlier than the driver's scheduled time.

In some implementations, the driver's scheduled time may be a time by which the vehicle is to be charged to a desired level (e.g., 70%, 100% of capacity). For example, the user may want to have the vehicle charged to 50% capacity while having a lunch. In some implementations, the driver's scheduled time may be a time by which the vehicle is to arrive at the destination set by the driver. In such cases, the time needed in charging the vehicle to a battery level that allows driving to the destination and the actual travel time to the destination, among others, may be taken into account while selecting the charging station.

As another example, the charging station selected based on the first, second, and third information may be a charging station that corresponds (e.g., matches) to filters applied by the user.

In some implementations, the processor 870 may display on the map information a graphical object that represents a charging station where charging can be completed before the driver's scheduled time or a charging station where the time it takes to charge the battery as required to travel to the destination (e.g., time taken for single charging or multiple chargings through the trip) plus the time it takes to travel from the charging station to the destination is earlier than the driver's scheduled time, as well as a charging station the vehicle can access while traveling in accordance with the route information.

In some implementations, the processor 870 may output on the map information different graphical objects in different manners to make the charging stations satisfying the different requirements distinctive from one another.

Afterwards, when one of the at least one graphical object is selected (S1106), the processor 870 may output to the display unit 251 first information relating to the charging station corresponding to the selected graphical object, based on the first information relating to charging stations received from the first external device 910 (S1108).

In this case, the first information relating to the charging station corresponding to the selected graphical object may be superimposed on the map information.

In addition, the processor 870 may send a charging reservation request to a server (e.g., first external device) of the charging station through the communication unit 810 so as to enable charging at the charging station corresponding to the selected graphical object (S1110).

The server (or first external device) of the charging station may complete the reservation for charging the vehicle 100 at the charging station corresponding to the selected graphical object, based on the charging reservation request (S1112).

With this configuration, the present disclosure may provide a user interface that informs the driver of charging stations in various ways by taking the driver's schedule into account, and that, once a certain charging station is selected by the user, allows the driver to start charging immediately after entering the charging station due to the charging reservation.

Figure 12:
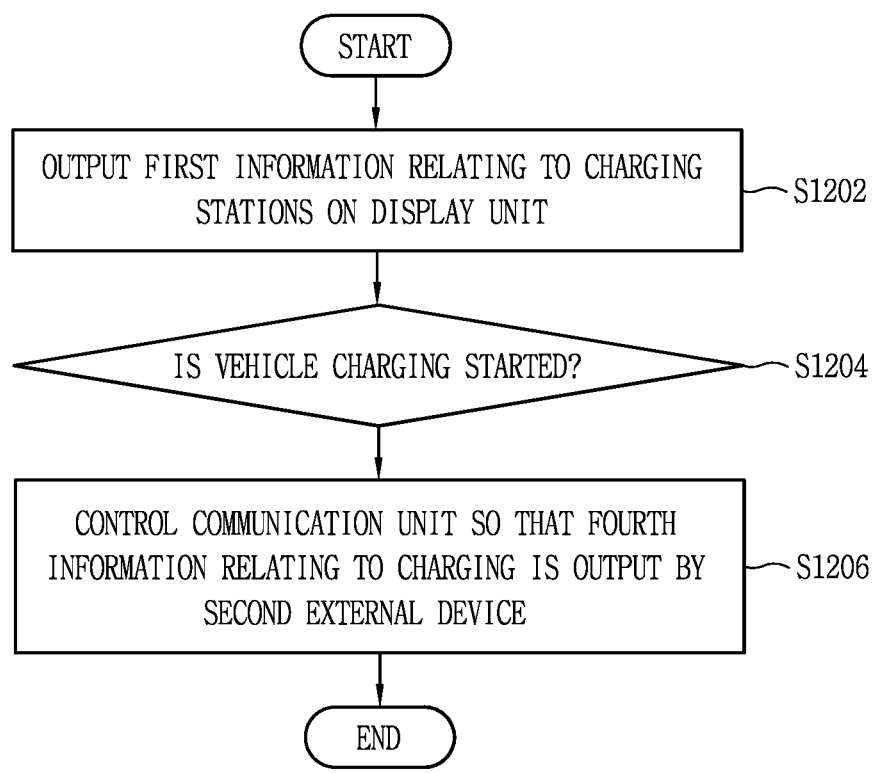

In some implementations, referring to FIG. 12, in the present disclosure, first information relating to charging stations may be output on the display unit 251 (S1202).

The first information relating to charging stations may be output in the process of selecting a charging station, before the vehicle arrives at the charging station, and may still be shown on the display unit 251 of the vehicle after the vehicle arrives at the charging station.

Afterwards, the processor 870 may sense by the sensing unit 820 whether the vehicle starts charging at the charging station or not (S1204). For example, the charging system of the vehicle can be monitored or sensed to determine whether power is being supplied to the vehicle (e.g., physically plugged in, inductive power transfer) and whether the battery is being charged.

Afterwards, once the vehicle 100 starts charging at the charging station, then the processor 870 may control the communication unit 810 so that fourth information relating to charging, which is generated based on the first, second, and third information, is output by the second external device 920 (S1206).

For example, once vehicle charging is started while fourth information relating to charging is shown on the display unit 251 of the vehicle, the processor 870 may send the fourth information to the second external device through the communication unit 810 so that the fourth information is output by the second external device 920.

In this case, the fourth information shown on the display 251 may be output by the output unit of the second external device 920.

In general, charging of an electric vehicle takes longer than refueling a conventional gasoline or diesel vehicle (e.g., 2 to 7 hours). As such, it is often the case that the driver leaves the charging station once vehicle charging is started.

In such cases, the present disclosure may provide a notification suggesting the driver to return to the charging station at a suitable time based on the location of the driver and the estimated time of completion of charging. Such notification will be described with reference to FIGS. 13A and 13B, For example, the processor 870 may receive location information of the second external device 920 (e.g., the driver's mobile terminal) through the communication unit 810.

The processor 870 may determine the distance between the vehicle 100 and the second external device 920 based on the location information of the second external device 920.

The processor 870 may acquire location information of the vehicle through the communication unit 810 and determine the distance between the vehicle and the second external device based on the location information of the vehicle and the location information of the second external device 920.

In this case, the second external device 920 may be the driver's mobile terminal, and therefore the location of the second external device 920 may correspond to the driver's location.

The processor 870 may receive location information of the second external device 920 at regular time intervals (or periodically or at all times or upon a user request), and calculate the speed of movement of the second external device 920 (e.g., the speed of movement of the driver) based on the time of receipt of the location information and the rate of change of the location information with time.

The processor 870 may calculate a departure time at which the driver should begin returning to the charging station from the driver's current location, based on the distance between the vehicle and the second external device, the speed of movement of the second external device, and the estimated time of completion of charging.

The processor 870 may send the calculated time information to the second external device 920 through the communication unit 810.

Here, the time at which the driver should begin to return to the charging station from the current location may refer to the time at which the driver should depart from the current location in order to arrive at the charging station by the time when the vehicle is estimated to complete charging.

The departure time for the driver to begin returning to the charging station from the current location may be calculated by subtracting an estimated travel time between the location of the second external device and the charging station from the estimated time of completion of charging.

In an example, the processor 870 may calculate the estimated time of completion of charging based on the amount of power currently required to charge the battery and the charging rate (or charging power) of a charger at the charging station.

As another example, the processor 870 may calculate the estimated time it takes for the driver to return from the current location to the charging station, based on the speed of movement of the second external device and the distance between the vehicle and the second external device.

The processor 870 may determine the time at which the driver needs to return to the charging station from the current location by subtracting the time it takes for the driver to return to the charging station from the estimated time of completion of charging.

At this point in time, vehicle charging may be in progress, and the driver may be informed to return before the completion of charging, with the estimated time it takes for the driver to return to the charging station taken into account.

The processor 870 may send a notification to the second external device through the communication unit 810 to remind the driver of the time that he or she needs to begin returning to the charging station from the current location.

If the driver departs to return to the charging station upon receiving the notification through the second external device at this point in time, the driver may arrive at the charging station within a given time from the estimated time of completion of charging.

With this configuration, the present disclosure may provide a user interface that, if the driver has moved to a place at a certain distance from the charging station, provides a notification at a suitable time to remind the driver to return in time for the completion of charging. By such an arrangement, idling time of the driver in waiting for completion of the charging can be reduced or eliminated, improving the user experience of the driver of the electric vehicle.

Also, the present disclosure may provide a notification in more diverse ways which reminds the driver who is at a distance from the charging station to return.

The processor 870 may determine the driver's estimated time of return to the charging station based on the second information (e.g., schedule information) relating to the driver.

Afterwards, the processor 870 may send to the second external device through the communication unit 810 information relating to the estimated amount of power to charge the vehicle until the driver's estimated time of return.

Figure 13A:
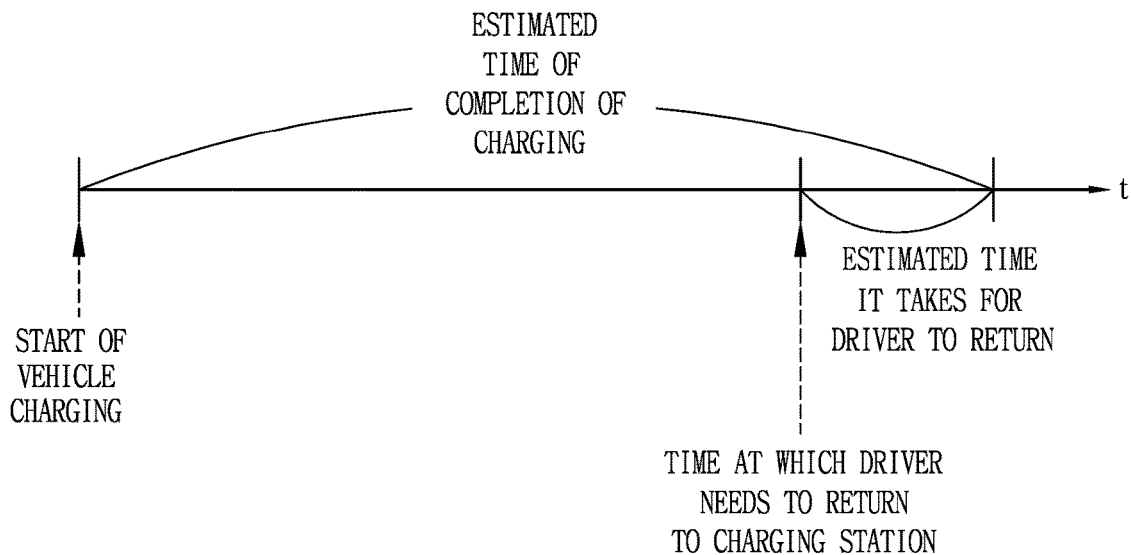
Figure 13B:
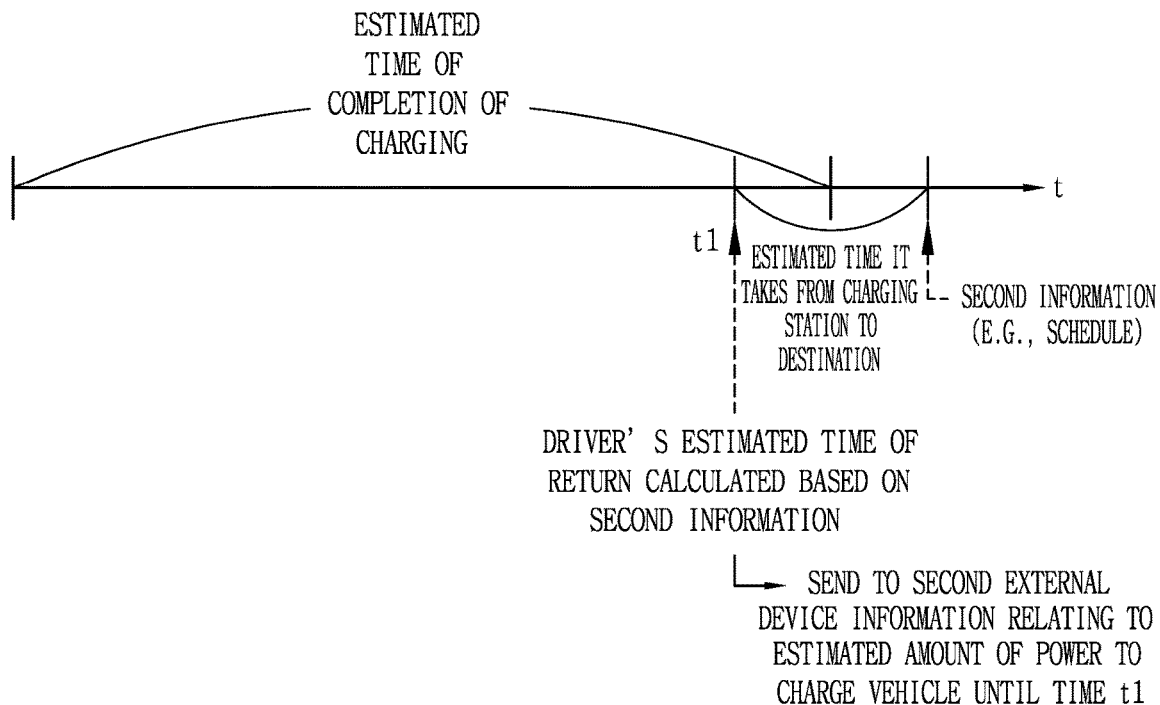

For example, as depicted in FIG. 13B, the processor 870 may determine the time at which the driver needs to return to the charging station from the current location by subtracting the time it takes for the driver to return to the charging station from the scheduled time, based on the second information (schedule information) relating to the driver.

As depicted in FIG. 13B, the estimated time t1 at which the driver is to return to the charging station may be a time at which the driver needs to depart from the charging station in order to arrive at the destination before the scheduled time.

If the estimated time t1 of return is earlier than the estimated time of completion of charging, the processor 870 may send to the second external device through the communication unit 810 information relating to the estimated amount of power to charge the vehicle until the estimated time of return. In some implementations, information relating to an expected charging level (e.g., battery charge level) of the vehicle at t1 may be transmitted to the second external device through the communication unit 810.

Also, the processor 870 may send to the second external device 920 through the communication unit 810 information on the time t1 when the driver needs to depart from the charging station to arrive at the destination before the scheduled time.

For example, the processor 870 may send information relating to the estimated amount of power to charge until the time t1 at which the driver needs to depart from the charging station.

Moreover, the processor 870 may send to the first external device a signal requesting that fast charging be done until the time t1, such that the vehicle can be charged to the highest level possible within the given time period.

In some implementations, when a distance between the vehicle and the second external device is a reference distance or more since the vehicle 100 starts charging at the charging station, the processor 870 may send to the second external device through the communication unit 810 fourth information relating to vehicle charging, For example, when a distance between the vehicle and the second external device is shorter than a reference distance, the processor 870 may output fourth information relating to vehicle charging to the output unit 830 mounted in the vehicle.

Upon receiving a user request, the processor 870 may send fourth information relating to vehicle charging to the second external device through the communication unit 810, even if the vehicle is moved less than a reference distance from the second external device.

In some implementations, when a distance between the vehicle and the second external device is a reference distance or more since the vehicle 100 starts charging at the charging station, the processor 870 may perform a preset control relating to the vehicle.

For example, the present control relating to the vehicle may include at least one among locking the vehicle doors, receiving images through a camera mounted in the vehicle, and sounding an alert if other users approach within a reference distance of the vehicle.

With this configuration, the present disclosure may provide a user interface that performs the most suitable operation for protecting the vehicle even if the driver is a reference distance or more from the vehicle since the vehicle starts charging and provides information relating to vehicle charging to the second external device to allow the user to easily get this information.

In some implementations, the present disclosure may provide various services in case that the estimated time of completion of charging is later than the driver's scheduled time.

Figure 14:
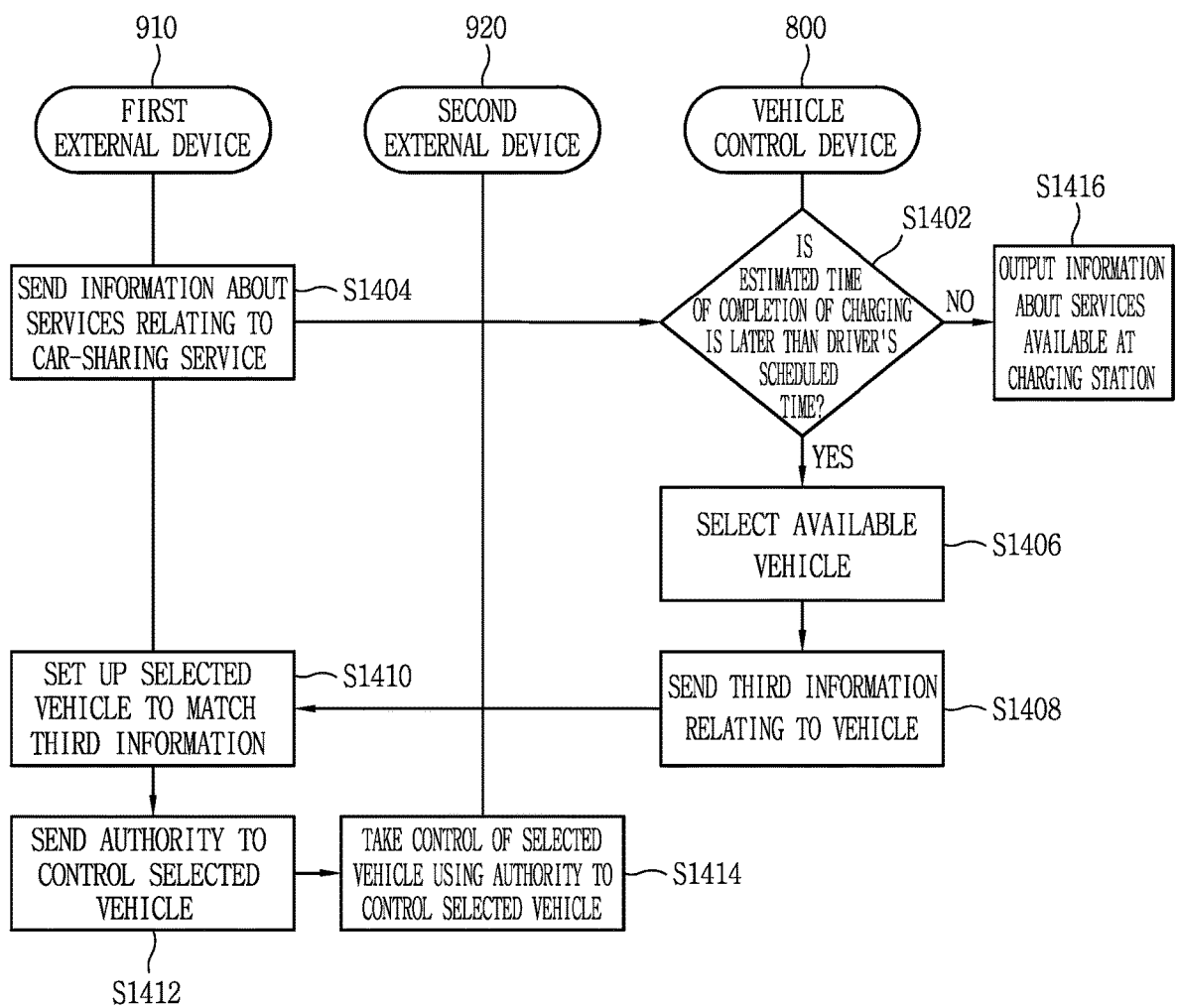

Referring to FIG. 14, the processor 870 of this disclosure may determine whether the estimated time of completion of charging is later than the driver's scheduled time or not (S1402).

If the estimated time of completion of charging is earlier than the driver's scheduled time, the processor 870 may output through the output unit 830 information about services available at the charging station, based on first information (S1416).

On the other hand, if the estimated time of completion of charging is later than the driver's scheduled time based on the first, second, and third information, the processor 870 may output through the output unit 830 information relating to car-sharing service by which the driver can use a temporary vehicle provided by the charging station for a certain period of time.

In this case, if the estimated time of completion of charging is later than the driver's scheduled time, the processor 870 may request/receive information relating to car-sharing service from the first external device (or the server of the charging station where the vehicle is being charged) (S1404).

The information relating to car-sharing service may include types of vehicles provided by the charging station, reservation hours, service hours, rental fees, etc.

In an example, upon receiving a user request for car-sharing service, the processor 870 may receive the authority to control a selected vehicle from the first external device 910, send the received authority to control the selected vehicle to the second external device 920, and control the communication unit 810 to send the third information relating to the vehicle to the selected vehicle.

For example, the processor 870 may receive the authority to control the selected vehicle from the first external device and send the received authority to control the selected vehicle to the second external device (the driver's mobile terminal) through the communication unit 810. Also, the processor 870 may send the third information relating to the vehicle to the selected vehicle through the communication unit 810. In some implementations, at least a portion of the third information may be included in fifth information that is transmitted to the selected vehicle.

In this case, on the selected vehicle, which has received the third information relating to the vehicle, information on a route along which the vehicle can travel to the destination may be configured to match the third information relating to the vehicle, and the vehicle settings may be done. In some implementations, the fifth information may be configured to control the selected vehicle such that route information of the selected vehicle matches the route information of the vehicle based on the at least a portion of the third information.

Here, the vehicle settings matching the third information relating to the vehicle may mean that seat positions, seat angles, sideview and room mirror angles, etc. are set up (changed) to fit the settings on the vehicle 100. In some implementations, the fifth information may be configured to change vehicle settings of the selected vehicle such that the vehicle settings of the selected vehicle match the vehicles settings of the vehicle being charged.

In another example, as depicted in FIG. 14, once an available vehicle is selected (S1406) while the information relating to car-sharing service is being output, the processor 870 may send information on the selected vehicle and the third information relating to the vehicle 100 to the first external device 910 (S1408).

The first external device 910 may set up the selected vehicle to match the third information, based on the received information on the selected vehicle and the third information (S1410).

For example, on the selected vehicle, which has received the third information relating to the vehicle, information on a route along which the vehicle can travel to the destination may be configured to match the third information relating to the vehicle, and the vehicle settings may be done.

Also, the first external device 910 may send the authority to control the selected vehicle to the second external device 920 (or vehicle control device 800) (S1412).

Using the control authority sent to the second external device 920, the driver may take control of the selected vehicle by means of the second external device 920 (S1414).

With this configuration, the present disclosure may provide a new user interface that allows for managing a schedule using the selected vehicle, even if the estimated time of completion of vehicle charging is later than the scheduled time.

Moreover, if the estimated time of completion of charging is later than the driver's scheduled time based on the first, second, and third information, the processor 870 may output through the output unit information about public transportation to reach the destination after charging the vehicle.

For example, the processor 870 may output through the output unit information about public transportation (e.g., subways, buses, etc.) to reach from the charging station to the destination matching the schedule information, or may execute a ride hailing application and automatically enter the destination based on the third information.

In some implementations, if there is a reference amount of time left before the estimated time of completion of charging or upon completion of charging, the processor may output information about services available at the charging station through the output unit or control the communication unit to output the same by the second external device, based on the first information relating to the charging station. (S1416).

For example, if there is no schedule information until the estimated time of completion of charging, or the scheduled time minus the travel time between the charging station and the destination matching the schedule information is later than the estimated time of completion of charging, the processor 870 may output information about services (e.g., car wash, periodic inspection, part replacement, etc.) available at the charging station through the output unit or by the second external device.

In this case, the information about services available at the charging station may be output through the output unit if the driver is in the vehicle, or may be output by the second external device if the driver is not in the vehicle.

In some implementations, the vehicle control device of this disclosure may allow the vehicle to drive autonomously.

The processor 870 may determine the time when the driver does not use, or is not scheduled to use, the vehicle, based on the second information relating to the driver.

Also, the processor 870 may allow the vehicle to drive autonomously to a certain charging station in autonomous driving mode so that charging is done within that time, allow the vehicle to be charged at the charging station, and allow the vehicle to return to the driver's location within that time by autonomous driving.

Figure 15:
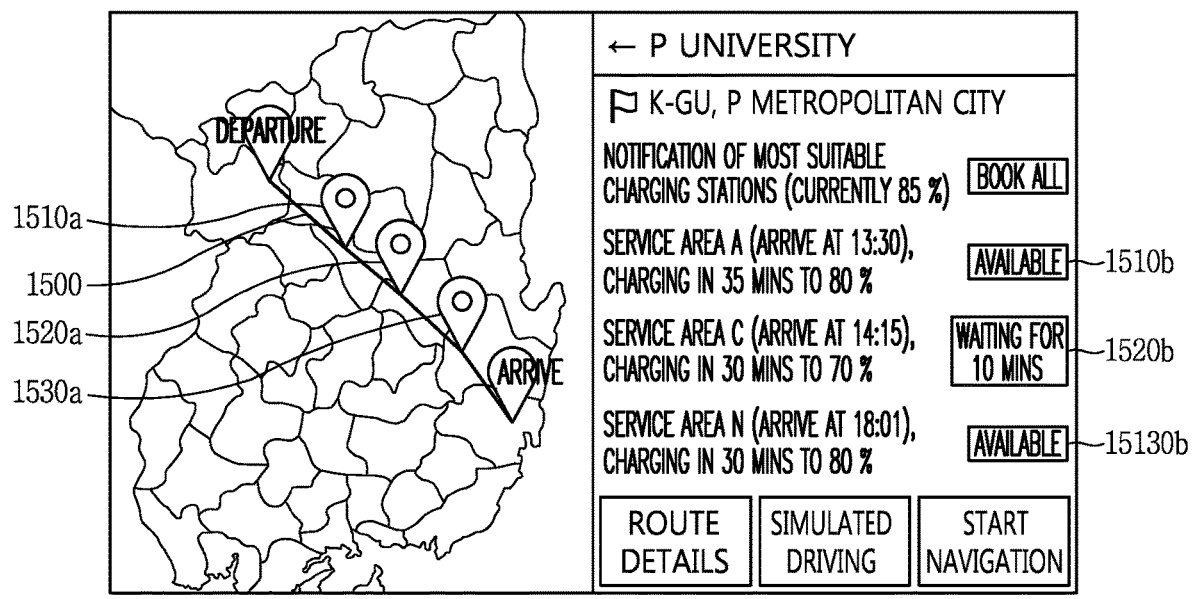
Figure 17:
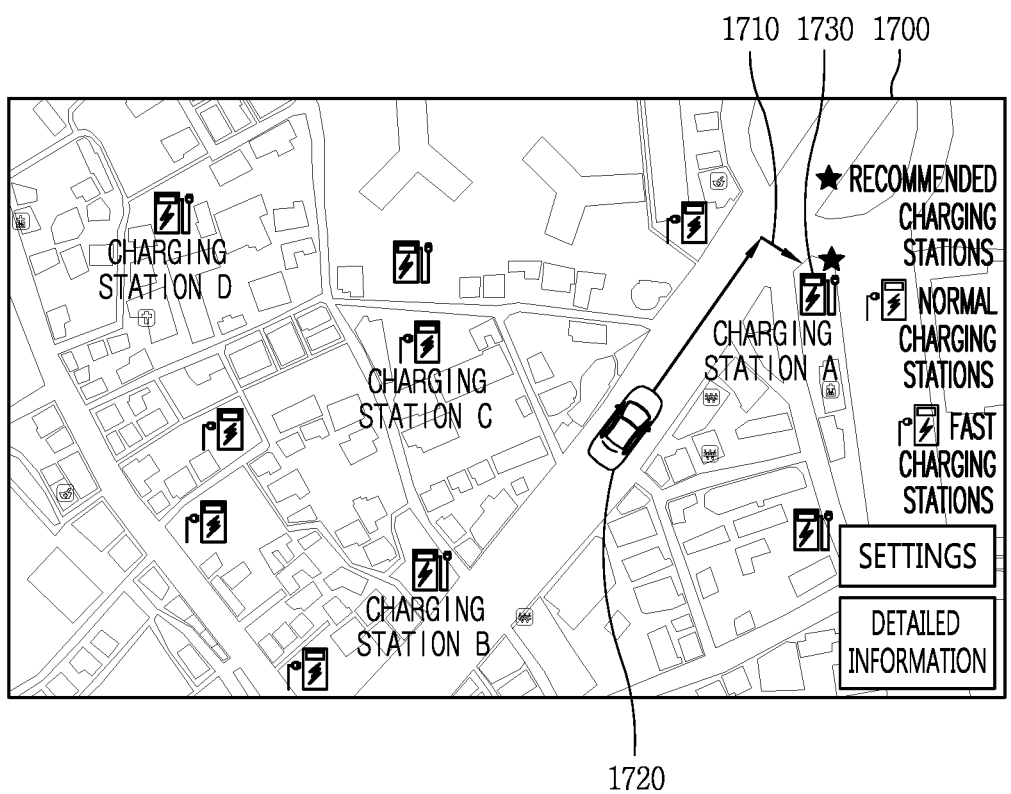

Now, various features of the foregoing description will be illustrated as an example in FIGS. 15 to 17.

Referring to FIG. 15, map information and preset route information 1500 may be displayed on the display unit 251. The processor 870 may enable the display of one or more graphical objects 1510a, 1520a, and 1530a representing charging stations the vehicle can access while traveling in accordance with route information, based on the first information relating to the charging stations, the second information relating to the driver, and the third information relating to the vehicle.

Further, the first information 1510b, 1520b, and 1530b relating to the charging stations may be displayed on the display unit 830.

For example, the first information relating to the charging stations may include the names of the charging stations, the estimated time of arrival at each charging station, reservation availability, etc.

When one of the graphical objects is selected, the corresponding charging station may be reserved.

In some implementations, as depicted in FIG. 16, the processor 870 of this disclosure may let the user select filters for filtering out charging stations (or detailed information to be displayed in search).

For example, the filters may include distance, support for the method of charging this vehicle, number of chargers, charging time, support for fast charging, estimated fees (upon completion of charging), support for car-sharing service and fees, official or non-official charging stations, support for completion-of-charging reminder service, and so on.

In this case, information relating to at least one charging station matching the filters may be output to the display unit 251 (or second external device 910).

Moreover, as depicted in FIG. 17, graphical objects (or icons) 1730 representing at least one charging station matching the above filters may be shown on map information 1700.

On the map information 1700, information 1720 indicating the current location of my vehicle and graphical objects representing at least one charging station matching the filters may be displayed.

In some implementations, the processor 870 may prioritize charging stations in order of most to least matching by using the filters (or priorities set by the driver). In some implementations, the processor 870 may display the graphical objects 1730 indicating charging stations in different ways in order of priority.

Furthermore, the processor 870 may output on the map information 1700 information on a route 1710, which can be taken by the vehicle to arrive at the highest-priority charging station.

In general, the above-described vehicle control device 800 may be included in the vehicle 100.

Moreover, the operation or control method of the above-described vehicle control device 800 may be analogously applied to the operation or control method of the vehicle 100 (or controller 170) in the same or similar ways.

In general, each of the previously described steps may be performed by the controller 170 mounted in the vehicle 100, as well as by the vehicle control device 800.

In addition, all the functions, configurations, or control methods performed by the above-described vehicle control device 800 may be performed by the controller 170 mounted in the vehicle 100. For example, all the control methods described in this specification may be applied to vehicle control methods or control methods of a control device.

Furthermore, the above-described vehicle control device 800 may be a mobile terminal. In this case, all the functions, configurations, or control methods performed by the vehicle control device 800 may be performed by the controller of the mobile terminal. Also, all the control methods explained in this specification may be analogously applied to mobile terminal control methods in the same or similar way.

For example, the mobile terminal may be configured in the form of a smartphone or a wearable device (e.g., watch, glasses, etc.).

Moreover, the mobile terminal may be connected through the communication unit to communicate with the vehicle control device.

On the other hand, as shown in FIG. 9, the communication unit 810, the sensing unit 820 and the output unit 830 described herein may be included in the vehicle 100 without being included in the vehicle control device 800. In this case, the function/operation/control performed by the communication unit 810 may be performed by the communication apparatus 400 of the vehicle, and the function/operation/control performed by the sensing unit 820 may be performed by the object detecting apparatus 300 or the sensing unit 120 of the vehicle, and the function/operation/control performed by the output unit 830 may be performed by the output unit 250 of the vehicle.

When the communication unit 810, the sensing unit 820 and the output unit 830 are provided in the vehicle 100, other than the vehicle control device 800, the vehicle control device 800 of the present invention may further include an interface unit (840) formed to communicate with the communication unit 810, the sensing unit 820 and the output unit 830.

The interface unit may serve as a path to various types of devices (for example, the communication unit 810, the sensing unit 820, and the output unit 830) provided in the vehicle 100. For example, the interface unit 130 may include a first port (or communication unit port)(841) for connecting to the communication unit 810, a second port (or sensing unit port)(842) for connecting to the sensing unit 820, and a third port (or an output unit port)(843) for connecting to the output unit 830.

In this case, the vehicle control device 800 may be connected to the communication unit 810, the sensing unit 820, and the output unit 830 through the first to third ports 841, 842, 843. In this case, the interface unit 840 may exchange data with the communication unit 810, the sensing unit 820, and the output unit 830 through the first to third ports 841, 842, 843.

The interface unit 840 is connected to the interface unit 130 provided in the vehicle to perform communication (or exchange data) with the communication unit 810, the sensing unit 820 and the output unit 830 provided in the vehicle.

In this case, the communication unit 810, the sensing unit 820, and the output unit 830 are connected to the interface unit 130 provided in the vehicle, and may exchange data with the vehicle control device through the interface unit 130 and the interface unit 840 included in the vehicle control device 800.

In other words, the communication unit 810, the sensing unit 820, and the output unit 830 may be included in the vehicle control device 800 or included in the vehicle 100.

At this time, when the communication unit 810, the sensing unit 820, and the output unit 830 are provided in the vehicle 100, data may be exchanged through the interface unit 840 of the vehicle control device 800 to perform the function/operation/control described herein.

The mobile terminal may send and receive through the communication unit various types of screen information, signals relating to vehicle control, and user input signals that have been explained in this specification.

Additionally, the mobile terminal may receive various types of screen information explained in this specification through the communication unit and output it on the display unit of the mobile terminal. Also, when a touch is applied (or a selection is made) through the display unit of the mobile terminal, the touched (selected) information may be sent to the vehicle control device. The vehicle can be controlled based on the touched information.

Furthermore, if the vehicle's gear is shifted or the vehicle's driving condition is changed, the vehicle control device may send information relating to the vehicle gear shift or the vehicle's driving condition to the mobile terminal through the communication unit. In this case, screen information on parking shown on the mobile terminal may be changed according to the description in this specification.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may include the processor or the controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A vehicle control device comprising:
an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;
at least one processor; and
a computer-readable medium coupled to the at least one processor having stored thereon instructions which, when executed by the at least one processor, causes the at least one processor to perform operations comprising:
receiving, through the communication unit of the vehicle, first information associated with charging stations from a first external device and second information associated with a driver of the vehicle from a second external device different from the first external device;
receiving, through the sensing unit of the vehicle, third information associated with the vehicle;
generating fourth information associated with charging of the vehicle based on at least one of the first information, the second information, or third information; and
outputting, through the communication unit or the output unit, the fourth information,
wherein outputting, through the communication unit or the output unit, the fourth information comprises:
determining, through the sensing unit, whether the driver is inside the vehicle;
based on a determination that the driver is inside the vehicle, outputting, through the communication unit, the fourth information associated with charging of the vehicle to the output unit; and
based on a determination that the driver is not inside the vehicle, transmitting, through the communication unit, the fourth information to the second external device.

2. The vehicle control device of claim 1, wherein the first information associated with charging stations comprises at least one of:
a distance between a current location of the vehicle and each of the charging stations, a charging method of each of the charging stations, a number of chargers available at each of the charging stations, a charging power of the chargers at each of the charging stations, services available at each of the charging stations, or an estimated time of completing charging of the vehicle at each of the charging stations,
wherein the second information associated with the driver comprises schedule information associated with the driver and available on the second external device, and
wherein the third information associated with the vehicle comprises at least one of:
route information configured to guide the vehicle to a destination, a charging method of the vehicle, or an amount of power required to charge the vehicle.

3. The vehicle control device of claim 2, wherein the fourth information associated with charging of the vehicle comprises at least one of:
at least one graphical object configured to represent the one or more charging stations accessible by the vehicle from a preset route of the vehicle based on the route information, a distance between the vehicle and the second external device, a speed of movement of the second external device, an estimated time of completing charging of the vehicle, a departure time for the driver to begin returning to the charging station to arrive at the charging station at the estimated time of completing charging of the vehicle, the driver's estimated time of return to the charging station, information associated with an estimated amount of power needed to charge the vehicle, information associated with at least one car-sharing service, information associated with public transportation to reach the destination, or information associated with services available at the charging station.

4. The vehicle control device of claim 1, wherein the operations comprise:
displaying, through the display unit, map information and preset route information associated with a preset route of the vehicle;
determining, based on the first, second, and third information, one or more charging stations accessible by the vehicle from the preset route of the vehicle; and
displaying, on the map information, at least one graphical object configured to represent the one or more charging stations accessible by the vehicle from the preset route of the vehicle.

5. The vehicle control device of claim 4, wherein the operations comprise:
receiving a selection of a graphical object from the at least one graphical object;
based on receipt of the selection, displaying, through the display unit, a portion of the first information corresponding to a charging station represented by the selected graphical object; and
transmitting, through the communication unit, a charging reservation request to a server associated with the selected charging station.

6. The vehicle control device of claim 1, wherein the operations comprise:
determining that the vehicle is being charged; and
based on the determination that the vehicle is being charged, transmitting, through the communication unit, the fourth information associated with charging of the vehicle to the second external device.

7. A vehicle control device comprising:
an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;
at least one processor; and
a computer-readable medium coupled to the at least one processor having stored thereon instructions which, when executed by the at least one processor, causes the at least one processor to perform operations comprising:
receiving, through the communication unit of the vehicle, first information associated with charging stations from a first external device and second information associated with a driver of the vehicle from a second external device different from the first external device;
receiving, through the sensing unit of the vehicle, third information associated with the vehicle;

generating fourth information associated with charging of the vehicle based on at least one of the first information, the second information, or third information;

outputting, through the communication unit or the output unit, the fourth information;

receiving, through the communication unit, location information of the second external device; and determining a distance between the vehicle and the second external device based on the location information of the second external device.

8. The vehicle control device of claim 7, wherein a location of the second external device corresponds to the location of the driver, and wherein the operations comprise:

calculating a departure time for the driver to begin returning to the charging station based on the distance between the vehicle and the second external device, a speed of movement of the second external device, and an estimated time of completing charging of the vehicle; and transmitting, through the communication unit, the departure time to the second external device.

9. The vehicle control device of claim 8, wherein calculating a departure time for the driver to begin returning to the charging station comprises:

subtracting an estimated travel time between the location of the second external device and the charging station from the estimated time of completing charging of the vehicle.

10. The vehicle control device of claim 7, wherein the operations comprise:

determining an estimated time of return to the charging station by the driver based on the second information associated with the driver; and transmitting, through the communication unit to the second external device, information associated with an expected charging level of the vehicle at the driver's estimated time of return.

11. The vehicle control device of claim 7, wherein the operations comprise:

determining that the vehicle is being charged;

determining that the distance between the vehicle and the second external device is greater than or equal to a reference distance; and based on the determination that (i) the vehicle is being charged, and (ii) the distance between the vehicle and the second external device is greater than or equal to a reference distance:

transmitting, through the communication unit, fourth information associated with charging of the vehicle, and performing a preset control associated with the vehicle.

12. The vehicle control device of claim 11, wherein the preset control associated with the vehicle comprises at least one of: locking doors of the vehicle, receiving images through a camera mounted in the vehicle, or outputting an audible alert if other users approach within a given distance of the vehicle.

13. A vehicle control device comprising:

an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;

at least one processor; and a computer-readable medium coupled to the at least one processor having stored thereon instructions which, when executed by the at least one processor, causes the at least one processor to perform operations comprising:

receiving, through the communication unit of the vehicle, first information associated with charging stations from a first external device and second information associated with a driver of the vehicle from a second external device different from the first external device;

receiving, through the sensing unit of the vehicle, third information associated with the vehicle;

generating fourth information associated with charging of the vehicle based on at least one of the first information, the second information, or third information;

outputting, through the communication unit or the output unit, the fourth information;

determining, based on the first, second, and third information, that an estimated time of completing charging of the vehicle at one of the charging stations is later than a scheduled charging completion time of the driver; and based on the determination that the estimated time of completing charging of the vehicle at one of the charging stations is later than the scheduled charging completion time of the driver, outputting, through the output unit, information associated with use of a temporary vehicle through a car-sharing service provided by the charging station.

14. The vehicle control device of claim 13, wherein the operations comprise:

receiving a user request for a car-sharing service;

based on receipt of the user request, receiving, through the communication unit, an authority to control a selected vehicle from the first external device;

transmitting, through the communication unit, the received authority to control the selected vehicle to the second external device; and transmitting, through the communication unit, fifth information to the selected vehicle, the fifth information comprising at least a portion of the third information associated with the vehicle.

15. The vehicle control device of claim 14, wherein the fifth information is configured to control the selected vehicle such that route information of the selected vehicle matches route information of the vehicle based on the at least a portion of the third information.

16. A vehicle control device comprising:

an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;

at least one processor; and a computer-readable medium coupled to the at least one processor having stored thereon instructions which, when executed by the at least one processor, causes the at least one processor to perform operations comprising:

receiving, through the communication unit of the vehicle, first information associated with charging stations from a first external device and second information associated with a driver of the vehicle from a second external device different from the first external device;

receiving, through the sensing unit of the vehicle, third information associated with the vehicle;

generating fourth information associated with charging of the vehicle based on at least one of the first information, the second information, or third information;

outputting, through the communication unit or the output unit, the fourth information;

determining, based on the first, second, and third information, that an estimated time of completing charging of the vehicle at one of the charging stations is later than a scheduled charging completion time of the driver; and based on the determination that the estimated time of completing charging of the vehicle at one of the charging stations is later than the scheduled charging completion time of the driver, outputting, through the output unit, information associated with use of a public transportation to reach a destination of the driver from the charging station.

17. The vehicle control device of claim 1, wherein the operations comprise:

determining that (i) the charging of the vehicle is complete, or (ii) a remaining time to complete charging of the vehicle is less than a reference time; and based on the determination that (i) the charging of the vehicle is complete, or (ii) the remaining time to complete charging of the vehicle is less than the reference time, performing at least one of:

outputting, through the output unit, information associated with services available at the charging station based on the first information associated with the charging station, or transmitting, through the communication unit, the information associated with services available at the charging station to the second external device.

18. A vehicle control device comprising:

an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;

at least one processor; and a computer-readable medium coupled to the at least one processor having stored thereon instructions which, when executed by the at least one processor, causes the at least one processor to perform operations comprising:

receiving, through the communication unit of the vehicle, first information associated with charging stations from a first external device and second information associated with a driver of the vehicle from a second external device different from the first external device;

receiving, through the sensing unit of the vehicle, third information associated with the vehicle;

generating fourth information associated with charging of the vehicle based on at least one of the first information, the second information, or third information;

outputting, through the communication unit or the output unit, the fourth information;

determining, based on the second information associated with the driver, a first time period during which the driver is not scheduled to use the vehicle; and controlling the vehicle to autonomously drive to a first charging station, charge the vehicle at the first charging station, and autonomously drive back to a location of the driver within the first time period.

19. A vehicle comprising:

a plurality of wheels;

a power source configured to drive at least one of the plurality of wheels; and a vehicle control device comprising:

an interface unit including a first port configured to be connected to a communication unit of a vehicle, a second port configured to be connected to a sensing unit of the vehicle configured to sense information associated with the vehicle, and a third port configured to be connected to an output unit of the vehicle comprising at least one of a display unit or an audio output unit;

at least one processor; and a computer-readable medium coupled to the at least one processor having stored thereon instructions which, when executed by the at least one processor, causes the at least one processor to perform operations comprising:

receiving, through the communication unit of the vehicle, first information associated with charging stations from a first external device and second information associated with a driver of the vehicle from a second external device different from the first external device;

receiving, through the sensing unit of the vehicle, third information associated with the vehicle;

generating fourth information associated with charging of the vehicle based on at least one of the first information, the second information, or third information;

outputting, through the communication unit or the output unit, the fourth information;

receiving, through the communication unit, location information of the second external device; and determining a distance between the vehicle and the second external device based on the location information of the second external device.

* * * * *